US012703095B1

(12) United States Patent
Tabatabaee et al.

(10) Patent No.: US 12,703,095 B1
(45) Date of Patent: Aug. 11, 2026

(54) SYSTEM FOR DETERMINING LOW-HEIGHT OBSTACLE FOR AUTONOMOUS MOBILE DEVICE MOVEMENT

(71) Applicant: AMAZON TECHNOLOGIES, INC., Seattle, WA (US)

(72) Inventors: Mohammad Hadi Tabatabaee, Sunnyvale, CA (US); Shreekant Gayaka, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 18/754,563

(22) Filed: Jun. 26, 2024

(51) Int. Cl.

| | |
|---|---|
| ***B25J 9/16*** | (2006.01) |
| ***G06T 7/10*** | (2017.01) |
| ***G06T 7/50*** | (2017.01) |
| ***G06T 7/60*** | (2017.01) |
| ***G06V 10/25*** | (2022.01) |
| ***G06V 10/762*** | (2022.01) |
| ***G06V 10/764*** | (2022.01) |

(52) U.S. Cl.
CPC ............... *B25J 9/1664* (2013.01); *G06T 7/10* (2017.01); *G06T 7/50* (2017.01); *G06T 7/60* (2013.01); *G06V 10/25* (2022.01); *G06V 10/762* (2022.01); *G06V 10/764* (2022.01)

(58) Field of Classification Search
CPC . B25J 9/1664; G06T 7/10; G06T 7/50; G06T 7/60; G06V 10/25; G06V 10/762; G06V 10/764
See application file for complete search history.

(56) References Cited

U.S. PATENT DOCUMENTS

2022/0382293 A1* 12/2022 Dong ........................ G06T 7/55
2023/0242149 A1* 8/2023 Alferdaous Alazem ..................... G01S 7/412 701/23
2023/0271556 A1* 8/2023 Kobashi ................ B60W 50/14 348/142

(Continued)

OTHER PUBLICATIONS

"SimpleBlobDetector::Params Struct Reference", OpenCV, 4 pgs. Retrieved from the Internet: URL: https://docs.opencv.org/4.x/d8/da7/structcv_1_1SimpleBlobDetector_1_1Params.html#a5793ee4bf7c2aaa460d2ab873a896081.

(Continued)

*Primary Examiner* — Mohamad O El Sayah
(74) *Attorney, Agent, or Firm* — Athorus, PLLC

(57) ABSTRACT

An autonomous mobile device (AMD) moves within a physical space that may include low-height obstacles (LHOs) that can be safely traversed. A sensor acquires depth image data including image data and distance data. The depth image data is processed to determine segmentation data, classifying pixels in the image as "floor" or "not floor". The segmentation data is processed to determine clusters of "not floor" pixels surrounded by "floor" pixels. A bounding box is determined around each cluster. The distance data is processed to determine heights of points above an estimated floor plane. The heights of the points corresponding to the pixels within each bounding box are used to calculate a metric, such as a ratio of points that are close to the floor compared to all points below a maximum height. A metric less than a threshold value indicates the bounding box may be deemed to contain an LHO.

20 Claims, 9 Drawing Sheets

(56) References Cited

U.S. PATENT DOCUMENTS

| | | | | |
|---|---|---|---|---|
| 2024/0028041 | A1* | 1/2024 | Klaus | G01S 17/931 |
| 2024/0265715 | A1* | 8/2024 | Ho | G06V 20/56 |

OTHER PUBLICATIONS

Caubalejo, Ralph, “Image Processing—Blob Detection”, Medium, Towards Data Science, Jan. 29, 2021, 11 pgs. Retrieved from the Internet: URL: https://towardsdatascience.com/image-processing-blob-detection-204dc6428dd.

* cited by examiner

Figure 8:
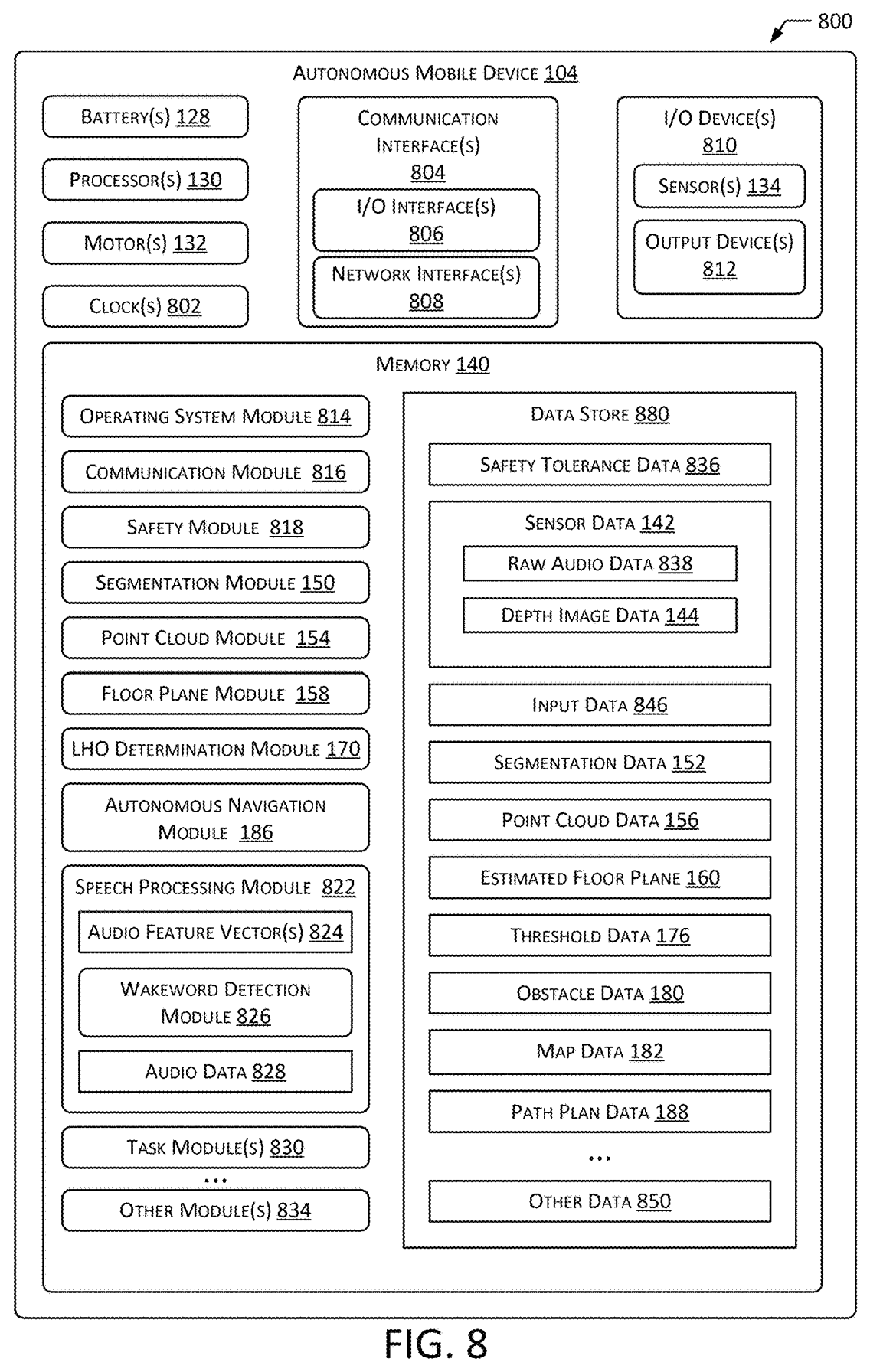

AUTONOMOUS MOBILE DEVICE 104

BATTERY(S) 128

PROCESSOR(S) 130

MOTOR(S) 132

CLOCK(S) 802

COMMUNICATION INTERFACE(S) 804

I/O INTERFACE(S) 806

NETWORK INTERFACE(S) 808

I/O DEVICE(S) 810

SENSOR(S) 134

OUTPUT DEVICE(S) 812

MEMORY 140

OPERATING SYSTEM MODULE 814

COMMUNICATION MODULE 816

SAFETY MODULE 818

SEGMENTATION MODULE 150

POINT CLOUD MODULE 154

FLOOR PLANE MODULE 158

LHO DETERMINATION MODULE 170

AUTONOMOUS NAVIGATION MODULE 186

SPEECH PROCESSING MODULE 822

AUDIO FEATURE VECTOR(S) 824

WAKEWORD DETECTION MODULE 826

AUDIO DATA 828

TASK MODULE(S) 830

...

OTHER MODULE(S) 834

DATA STORE 880

SAFETY TOLERANCE DATA 836

SENSOR DATA 142

RAW AUDIO DATA 838

DEPTH IMAGE DATA 144

INPUT DATA 846

SEGMENTATION DATA 152

POINT CLOUD DATA 156

ESTIMATED FLOOR PLANE 160

THRESHOLD DATA 176

OBSTACLE DATA 180

MAP DATA 182

PATH PLAN DATA 188

...

OTHER DATA 850

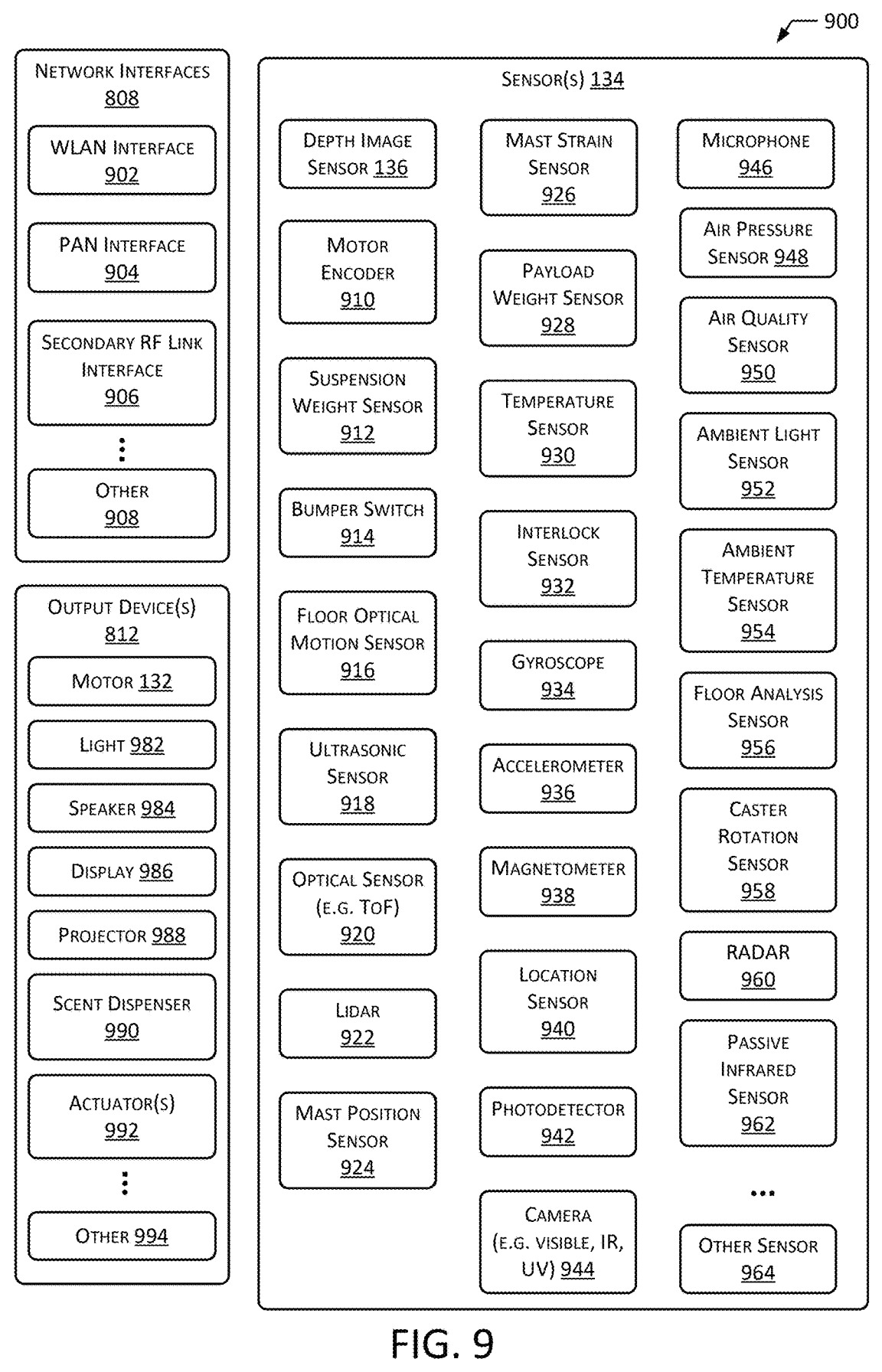

NETWORK INTERFACES 808

WLAN INTERFACE 902

PAN INTERFACE 904

SECONDARY RF LINK INTERFACE 906

OTHER 908

OUTPUT DEVICE(S) 812

MOTOR 132

LIGHT 982

SPEAKER 984

DISPLAY 986

PROJECTOR 988

SCENT DISPENSER 990

ACTUATOR(S) 992

OTHER 994

SENSOR(S) 134

DEPTH IMAGE SENSOR 136

MOTOR ENCODER 910

SUSPENSION WEIGHT SENSOR 912

BUMPER SWITCH 914

FLOOR OPTICAL MOTION SENSOR 916

ULTRASONIC SENSOR 918

OPTICAL SENSOR (E.G. TOF) 920

LIDAR 922

MAST POSITION SENSOR 924

MAST STRAIN SENSOR 926

PAYLOAD WEIGHT SENSOR 928

TEMPERATURE SENSOR 930

INTERLOCK SENSOR 932

GYROSCOPE 934

ACCELEROMETER 936

MAGNETOMETER 938

LOCATION SENSOR 940

PHOTODETECTOR 942

CAMERA (E.G. VISIBLE, IR, UV) 944

MICROPHONE 946

AIR PRESSURE SENSOR 948

AIR QUALITY SENSOR 950

AMBIENT LIGHT SENSOR 952

AMBIENT TEMPERATURE SENSOR 954

FLOOR ANALYSIS SENSOR 956

CASTER ROTATION SENSOR 958

RADAR 960

PASSIVE INFRARED SENSOR 962

OTHER SENSOR 964

FIG. 9

SYSTEM FOR DETERMINING LOW-HEIGHT OBSTACLE FOR AUTONOMOUS MOBILE DEVICE MOVEMENT

BACKGROUND

An autonomous mobile device (AMD) or mobile robotic device moves throughout a physical space. To facilitate this movement, the AMD gathers information about the physical space to determine maps used to perform tasks, such as moving in the physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates clusters and bounding boxes of segmentation data, according to some implementations.

FIG. 8 is a block diagram of the components of the AMD, according to some implementations.

FIG. 9 is a block diagram of some components of the AMD, such as network interfaces, sensors, and output devices, according to some implementations.

Figure 1:
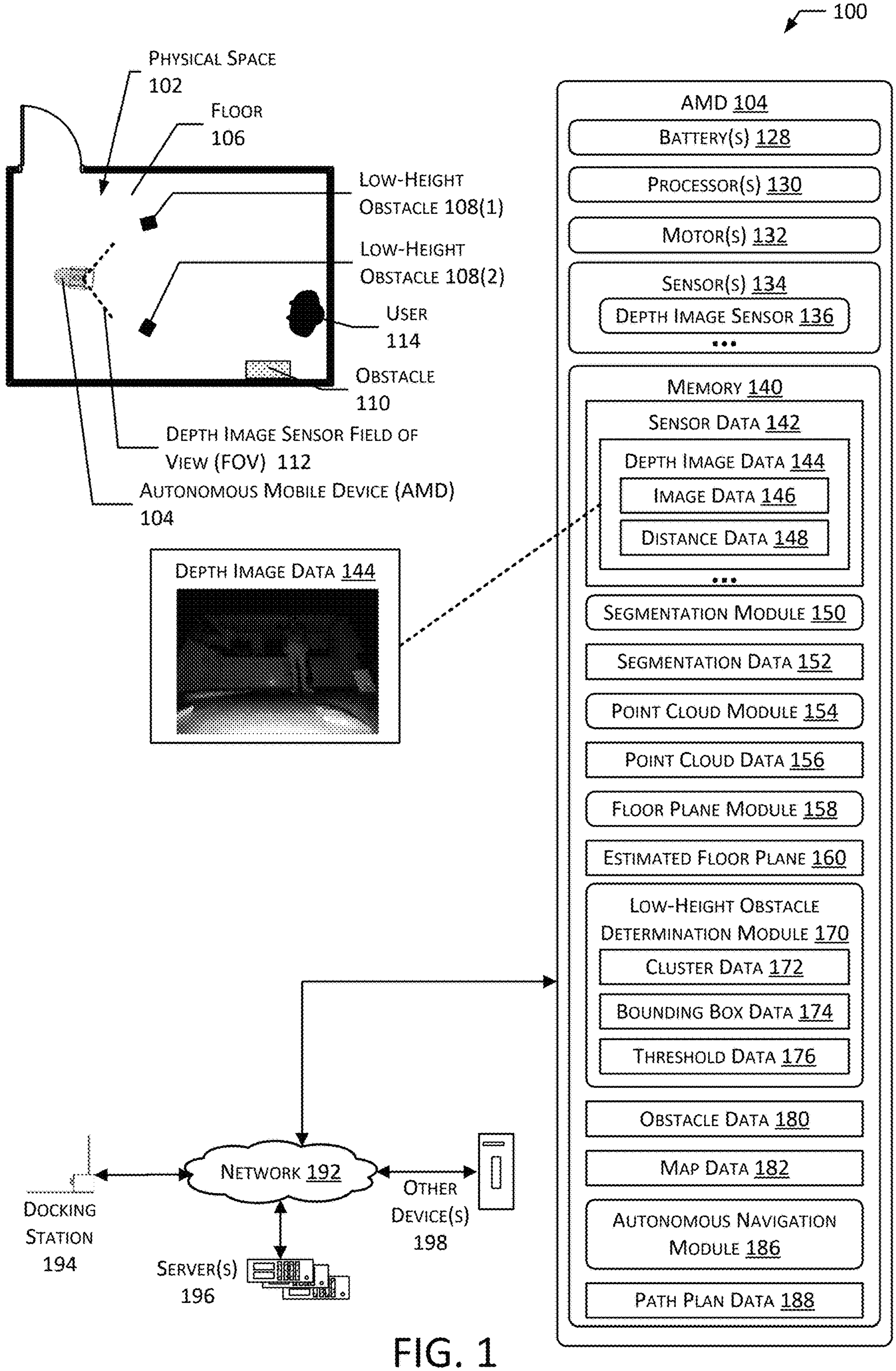
FIG. 1 illustrates a system for determining low-height obstacles in a physical space for autonomous mobile device (AMD) navigation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a mobile robotic device is capable of performing tasks. These tasks may include autonomous movement in which the AMD moves between locations in a physical space without being driven or controlled by a user. Autonomous movement uses information about the physical space, such as maps indicating where obstacles and other objects are located. For example, an occupancy map indicating the locations of obstacles may be used to determine a path plan between locations in the physical space.

The obstacles within the physical space may be considered low-height obstacles (LHOs) that the AMD can safely traverse or blocking obstacles that the AMD is unable to traverse. For example, the AMD may be able to drive or walk over an LHO, while blocking obstacles prevent the passage of the AMD. The AMD may be operated to avoid traversing an LHO if possible. For example, the AMD may go around an LHO if such a path exists.

An incorrect determination of an LHO or a blocking obstacle may result in the AMD being unable to complete a task or may result in the AMD taking an unnecessarily circuitous route to complete the task. For example, if all possible routes to a destination specified by a task include blocking obstacles, the AMD may fail to complete the task. In another example, incorrectly determined LHOs may result in a path that includes more turns to avoid the LHOs, resulting in the AMD taking more time to reach a destination specified by a task.

Described in this disclosure are techniques to determine the presence of LHOs that may be used to facilitate AMD movement. A depth image sensor, such as a depth camera, acquires depth image data that includes image data and distance data. The image data depicts the scene within a field-of-view (FOV) of the depth image sensor. The distance data is indicative of a distance from the sensor to an object that is detected. In some implementations there may be a one-to-one correspondence between pixels in the image data and pixels within the distance data. For example, each pixel in the image data that represents a portion of the scene may have an associated distance value.

The image data is processed to determine segmentation data in which pixels in the image are associated with a respective class. For example, the image data may be processed by a previously trained machine learning (ML) system such as an ML model that provides as an output, for each pixel, an indication of a classification and confidence value indicative of a likelihood that the classification is correct. Continuing the example, the segmentation data may indicate that individual pixels within the image data are associated with a "floor" class or a "not floor" class.

The segmentation data is processed to determine clusters of "not floor" pixels that are surrounded by "floor" pixels. For example, a cluster may comprise a set of pixels that are associated with the "not floor" class, that are contiguous to one another, and are either bounded by an edge of segmentation data or a pixel that is associated with the "floor" class.

A bounding box is determined around each cluster. For example, a rectangle may be drawn around each cluster. If a bounding box is greater than a threshold area, it may be divided into smaller bounding boxes.

The distance data is processed to determine heights of points above an estimated floor plane. For example, distance data may be processed to determine point cloud data. The point cloud data comprises coordinates that specify the location, with respect to the physical space, of a plurality of points. The point cloud data may be used to determine an estimated floor plane of a floor that is supporting the AMD.

Given the estimated floor plane and the coordinates, a height of each point above the estimated floor plane may be calculated.

The heights of the points corresponding to the pixels within each bounding box are used to calculate a metric. For example, the metric may be a ratio of points that are close to the floor compared to all points below a maximum height. If the metric is less than a threshold value, the cluster associated with the bounding box may be deemed to contain an LHO. If the metric is greater or equal to the threshold value, the cluster associated with the bounding box may be deemed to be a blocking obstacle. During operation, the AMD may move through the areas of the physical space that are associated with LHOs, and may avoid the blocking obstacles. For example, the AMD may drive over an LHO to reach a destination, and may drive around a blocking obstacle to reach the destination.

The system and techniques as described herein are computationally efficient. This enables use of AMDs with limited compute resources, while providing low latency results that allow the AMD to distinguish low-height obstacles from blocking obstacles in a timely fashion. This permits the AMD to determine paths through the physical space that are unimpeded by the LHOs, reducing travel time while moving autonomously and improving the customer experience.

Illustrative System

FIG. 1 illustrates a system 100 for determining low-height obstacles in a physical space 102 for autonomous mobile device (AMD) 104 navigation, according to some implementations.

The AMD 104 is shown in a physical space 102 that includes a floor 106. On the floor 106 are low-height obstacles (LHO) 108(1)-(2), an obstacle 110, and a user 114. The LHOs 108 may comprise obstacles that the AMD 104 may safely traverse. For example, the AMD 104 may have sufficient clearance to drive or walk over an LHO 108. In comparison, the obstacle 110 that is not an LHO may be considered a blocking obstacle that the AMD 104 is unable to traverse. For example, the obstacle 110 may comprise a cabinet that the AMD 104 must move around.

The AMD 104 may include one or more batteries 128, one or more processors 130, one or more motors 132, sensors 134, and memory 140. Other components of the AMD 104 are discussed with regard to FIGS. 8 and 9.

The AMD 104 uses the sensors 134 to acquire sensor data 142 about the physical space 102. The sensor data 142 may be stored in the memory 140. The sensors 134 may include a depth image sensor 136, and so forth.

The one or more sensors 134 may have different fields of view (FOV) during operation. For example, the depth image sensor 136 may have a depth image sensor FOV 112 as shown. An FOV is the extent of the physical space 102 represented by the sensor data 142 acquired using one or more sensors 134. The depth image sensor 136 acquires depth image data 144 of a scene that may include the floor 106 and other portions of the physical space 102.

The depth image data 144 may comprise image data 146 and distance data 148. The image data 146 comprises an image of the scene within the FOV 112. For example, the image data 146 may comprise a color or grayscale image of the scene using visible or infrared light. The distance data 148 is indicative of a distance from the depth image sensor 136 to a detected object.

The depth image sensor 136 may comprise a depth camera that includes an image sensor and a time-of-flight (ToF) system with an illuminator. During operation, the image sensor may be used to acquire the image data 146. The ToF system may use a direct or indirect time of flight approach to determine the distance data 148. For example, the system may use an indirect ToF approach involving emitting modulated light and determining a phase shift between emitted and received light to estimate distance (e.g. utilizing pixels that are configured to accumulate charge from a photodiode for a first period in sync with an emitter in a first well and accumulating charge from a photodiode for a second period out of sync with the emitter in a second well and then calculating a phase shift of a returning signal based on a proportion between the wells, preferably after this has been repeated for some period to allow for sufficient charge accumulation over a configured integration time).

The depth camera may use the ToF system to determine a distance between the image sensor and an object in the physical space 102 that reflects some of the light from the illuminator. For example, the depth camera may comprise an IRS1125C depth camera from Infineon Technologies AG of Neubiberg, Germany.

In other implementations, the depth image sensor 136 may use other techniques to determine depth image data 144. In one implementation the depth image sensor 136 may comprise a coded aperture camera comprising an imaging sensor and a coded aperture mask. In another implementation, the depth image sensor 136 may comprise a camera and an emitter that projects a structured light pattern onto a scene. Distance may be determined based on an image of the scene that includes the structured light pattern and distortion of the structured light pattern by objects in the scene. In another implementation the depth image sensor 136 may comprise a plurality of cameras that acquire images of an overlapping portion of a scene, such as a stereocamera.

The depth image data 144 may comprise a two-dimensional array of pixel values (pixels). Each pixel in the array may be associated with image data 146, such as an intensity associated with a particular color channel. Each pixel in the array may also be associated with distance data 148 comprising a distance value that is indicative of a distance from the depth camera to a detected object. For example, the depth image data 144 may be visualized as a pair of bitmaps of the same scene: the image data 146 comprising an image and the distance data 148 comprising a representation like the image in which the "color" or intensity of the pixel is indicative of the distance to an object associated with that pixel, if any. For example, the distance data 148 may be visualized as a greyscale image in which an intensity value for a pixel in the greyscale image indicates or corresponds to a distance.

In some implementations there may be a one-to-one correspondence between pixels in the image data 146 and pixels within the distance data 148. For example, each pixel in the image data 146 that represents a portion of the scene may have an associated distance value in the distance data 148. In other implementations a different correspondence may be used. For example, the distance data 148 may be sparse compared to the image data 146, and so one pixel of distance data 148 may be associated with many pixels of image data 146.

Additional sensors 134 are discussed with regard to FIG. 9.

A segmentation module 150 may be used to process image data 146 of the depth image data 144 and determine segmentation data 152. The segmentation module 150 may comprise a previously trained machine learning (ML) system, such as a ML model, neural network, classifier, and so forth. The segmentation data 152 may indicate a particular class and confidence value of that class for each pixel in the image data 146. For example, the segmentation data 152 may indicate that an image data 146 pixel located at row 45, column 91 associated with the class "floor", and a confidence value of 0.94 that the classification is correct. In some implementations the segmentation module 150 may determine segmentation data 152 from a set of classes that include "floor" indicating that a pixel is associated with the floor 106, and one or more classes that are "not-floor" indicating that a pixel is associated with something other than the floor 106. The segmentation data 152 may comprise segmentation regions, comprising groups of pixels that are associated with a common class.

In another implementation, the segmentation module 150 may process distance data 148 of the depth image data 144 or point cloud data 156 to determine the segmentation data 152. As described above, the segmentation module 150 may comprise a previously trained ML system, such as a neural network, classifier, and so forth. In yet another implementation, the segmentation module 150 may process one or more of the image data 146, distance data 148, or the point cloud data 156 to determine the segmentation data 152.

A point cloud module 154 may be used to process distance data 148 and determine the point cloud data 156. For example, the point cloud module 154 may receive localization data from an autonomous navigation module 186 that is indicative of a location and pose of the AMD 104 in the physical space 102 with respect to specified reference axes. The distance data 148 may be processed given the characteristics of the depth image sensor 136 and the distance data associated with pixels to convert an apparent location in the depth image data 144 of an object to a three-dimensional point with respect to the specified reference axes. The point cloud data 156 may comprise these three-dimensional points expressed as coordinates with regard to three mutually orthogonal axes.

In one implementation a floor plane module 158 may accept the point cloud data 156 and determine as output an estimated floor plane 160, e.g. a set of parameters a, b, c for a plane defined with a plane equation $ax+by+cz+d=0$. For example, the floor plane module 158 may use a random sample consensus (RANSAC) algorithm to process the point cloud data 156 or a portion of the point cloud data 156 to attempt to fit a plane to the data and determine the estimated floor plane 160.

In accordance with one or more implementations, a set of points is determined from the point cloud data 156 based on filtering the point cloud data 156 using a height filter to only keep the points within a "floor plane threshold" of the ground plane of the device, i.e. a point with a height value in the interval of (-floor_plane_threshold, +floor_plane_threshold). In accordance with one or more implementations, floor_plane_threshold is a tunable parameter that may be set to, for example, 0.05 meters.

In accordance with one or more implementations, height-filtered point cloud data 156 is further filtered to only keep points that are associated with corresponding pixels in the image data 146 that have been determined to be in the "floor" class.

In accordance with one or more implementations, a RANSAC approach involves determining a first subset of points based on randomly selecting points from the point cloud data 156 or portion thereof (e.g. the height-filtered and class-filtered portion), determining model parameters for a plane based on the first subset, and then determining for each respective point of the point cloud data 156 or portion thereof whether that point does not fit the model within some defined threshold (which can be characterized as an outlier) or does fit the model within some defined threshold (which can be characterized as an inlier). The set of inliers can be characterized as a consensus set.

In accordance with one or more implementations of a RANSAC approach, a size of the consensus set or a proportion of inliers relative to the total set or outliers relative to the total set, or a ratio of inliers to outliers or vice versa, can be used to determine whether determined model parameters are a sufficient fit.

In accordance with one or more implementations of a RANSAC approach, this approach is repeated for a configured number of iterations each time using a new randomly chosen first subset of points, with best fit model parameters among all the iterations being returned following completion of all of the iterations. In accordance with one or more implementations of a RANSAC approach, model parameters are automatically rejected as a fit for a floor plane if an absolute value of the estimated floor plane height value is greater than a utilized floor plane threshold.

In accordance with one or more implementations, model parameters can optionally be refined based on a consensus set (e.g. new model parameters for a plane can be determined based on the entire consensus set), and the system can again determine for each respective point of the point cloud data 156 or portion thereof whether that point does not fit the model within some defined threshold (which can be characterized as an outlier) or does fit the model within some defined threshold (which can be characterized as an inlier).

In another implementation, the floor plane module 158 may comprise a previously trained machine learning model that accepts input, such as the depth image data 144, and determines the estimated floor plane 160. In some implementations, a portion of the depth image data 144 that is associated with a "floor" class as determined by the segmentation module 150 may be used to determine the estimated floor plane 160. In some implementations the determination of the estimated floor plane 160 may be determined based at least in part on one or more physical characteristics of the AMD 104. For example, given a known height of the depth image sensor 136 above the lowest point of the wheels or legs of the AMD 104, the floor 106 may be assumed to be a plane that is within some threshold distance of that height to accommodate sensor noise and other factors. The estimated floor plane 160 may thus be indicative of the floor plane that the AMD 104 is deemed to be supported by at the time of acquisition of the depth image data 144. The floor plane module 158 may utilize data from other sensors 134, such as data from an accelerometer or tilt sensor to determine orientation of the AMD 104 or the sensors 134 with respect to local vertical.

Once the estimated floor plane 160 has been determined, a height above the floor 106 may be calculated for points within the point cloud data 156. For example, the height above the floor 106 may comprise the distance between the estimated floor plane 160 and a normal line that extends from the estimated floor plane 160 to a point in the point cloud data 156.

An LHO determination module 170 accepts as input the segmentation data 152, the point cloud data 156, and the estimated floor plane 160 and determines as output obstacle data 180. The obstacle data 180 may be indicative of whether an LHO 108 or an obstacle 110 is determined to be present at a particular location or area within the physical space 102.

During operation, the LHO determination module 170 may process the segmentation data 152 to determine cluster data 172 that is indicative of any clusters of pixels classified as "non-floor" that are adjacent to pixels classified as "floor". For example, a cluster may comprise a group of contiguous "non-floor" pixels that form an island within pixels classified as "floor". This is discussed in more detail with regard to FIG. 4.

Once a cluster has been determined, bounding box data 174 may be determined. For example, a bounding box may be drawn that encompasses the cluster. The bounding box may be rectangular. In some implementations the boundaries of the bounding box may be some threshold amount larger than the extremities of the cluster. For example, the bounding box may be drawn that is 2 pixels distal from the outermost points of the cluster.

The point cloud data 156 that is associated with the pixels within the bounding box may then be assessed to determine a metric. In one implementation the metric may comprise a ratio of counts of points within the bounding box that meet specified criteria. For example, a first count may indicate the number of points within the bounding box that have a height above the estimated floor plane 160 that is less than a first threshold height. In another example, the first count may indicate the number of points within the bounding box that have a negative height value. In some implementations the first threshold height may be determined based on the height of an obstacle that the AMD 104 is able to safely traverse with little or no chance of being stopped. Continuing the example, the first count may comprise a count of all those points within the bounding box that are less than 0.5 centimeter (cm) above the estimated floor plane 160. A second count may be calculated that comprises a count of all those points within the bounding box that are less than a second threshold height, that is greater than the first threshold height. In some implementations the second threshold height may be determined as a minimum height of an obstacle that the AMD 104 is unable to traverse. Continuing the example, the second count may comprise a count of all those points within the bounding box that are less than 4 cm above the estimated floor plane 160. The metric may be calculated by dividing the first count by the second count. If the metric is less than a threshold, the portion of the physical space 102 that is represented within the bounding box may be deemed to be an LHO 108. As a result, the AMD 104 may be permitted to traverse the area associated with the LHO 108. If the metric is greater than the threshold, the portion of the physical space 102 may be deemed to be a blocking obstacle, and the AMD 104 may avoid traversing that area within the physical space 102.

In some implementations the obstacle data 180 may be used to update map data 182. The map data 182 may comprise a representation of the physical space 102 that includes the blocking obstacles 110 and their locations in the physical space 102. The map data 182 may be implemented using any data structure that provides for storage and modification of data. For example, map data 182 may be managed by one or more arrays, one or more database records, one or more lists, one or more data objects, one or more graphs, and so forth.

One or more of the thresholds used by the various modules may be stored as the threshold data 176. Operation of the LHO determination module 170 is discussed in more detail below with regard to FIGS. 2-7.

An autonomous navigation module 186 provides the AMD 104 with the ability to navigate within the physical space 102 without real-time human interaction. During operation, the AMD 104 may use the sensor data 142 to determine information such as where the AMD 104 is, how far the AMD 104 has moved, the presence and location of different types of objects in the physical space 102, and so forth. The autonomous navigation module 186 may include a simultaneous localization and mapping (SLAM) module. Localization is determining where the AMD 104 is in the physical space 102 and may utilize some external reference. For example, cameras may acquire images. These images are processed to determine the presence of features in the images, such as edges of doors, shadows on the wall, texture on the walls, and so forth. Odometry sensors may be used to determine a distance and direction travelled, and so forth.

The autonomous navigation module 186 may implement, or operate in conjunction with, a mapping module. For example, the mapping module may be used to determine the map data 182 based on the sensor data 142, obstacle data 180, and so forth.

The autonomous navigation module 186 may use the map data 182 to determine a set of possible paths from a current location to a destination location, along which the AMD 104 may move. One of these may be selected and used to determine path plan data 188 indicative of a path. For example, a possible path that is the shortest or has the fewest turns may be selected and used to determine the path. The path is then subsequently used to determine a set of commands that drive the motors 132 connected to the wheels of the AMD 104. For example, the autonomous navigation module 186 may determine the current location within the physical space 102 and determine path plan data 188 that describes the path to a destination location such as the docking station 194.

The autonomous navigation module 186 may utilize various techniques during processing of sensor data 142. For example, image data 146 obtained from cameras on the AMD 104 may be processed to determine one or more of corners, edges, planes, and so forth.

The AMD 104 may use a network interface to connect to a network 192. For example, the network 192 may comprise a wireless local area network, that in turn is connected to a wide area network such as the Internet.

The AMD 104 may be configured to dock or connect to a docking station 194. The docking station 194 may provide external power which the AMD 104 may use to charge the battery 128 of the AMD 104.

The docking station 194 may also be connected to the network 192. For example, the docking station 194 may be configured to connect to the wireless local area network 192 such that the docking station 194 and the AMD 104 may communicate.

The AMD 104 may access one or more servers 196 via the network 192. For example, the AMD 104 may utilize a wakeword detection module to determine if the user 114 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 114 to one or more servers 196 for further processing. The servers 196 may process the spoken audio and return to the AMD 104 data that may be subsequently used to operate the AMD 104.

The AMD 104 may also communicate with other devices 198. The other devices 198 may include one or more devices that are within the physical space 102 such as a home or associated with operation of one or more devices in the physical space 102. For example, the other devices 198 may include a doorbell camera, a garage door opener, a refrigerator, washing machine, and so forth. In some implementations, the other devices 198 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
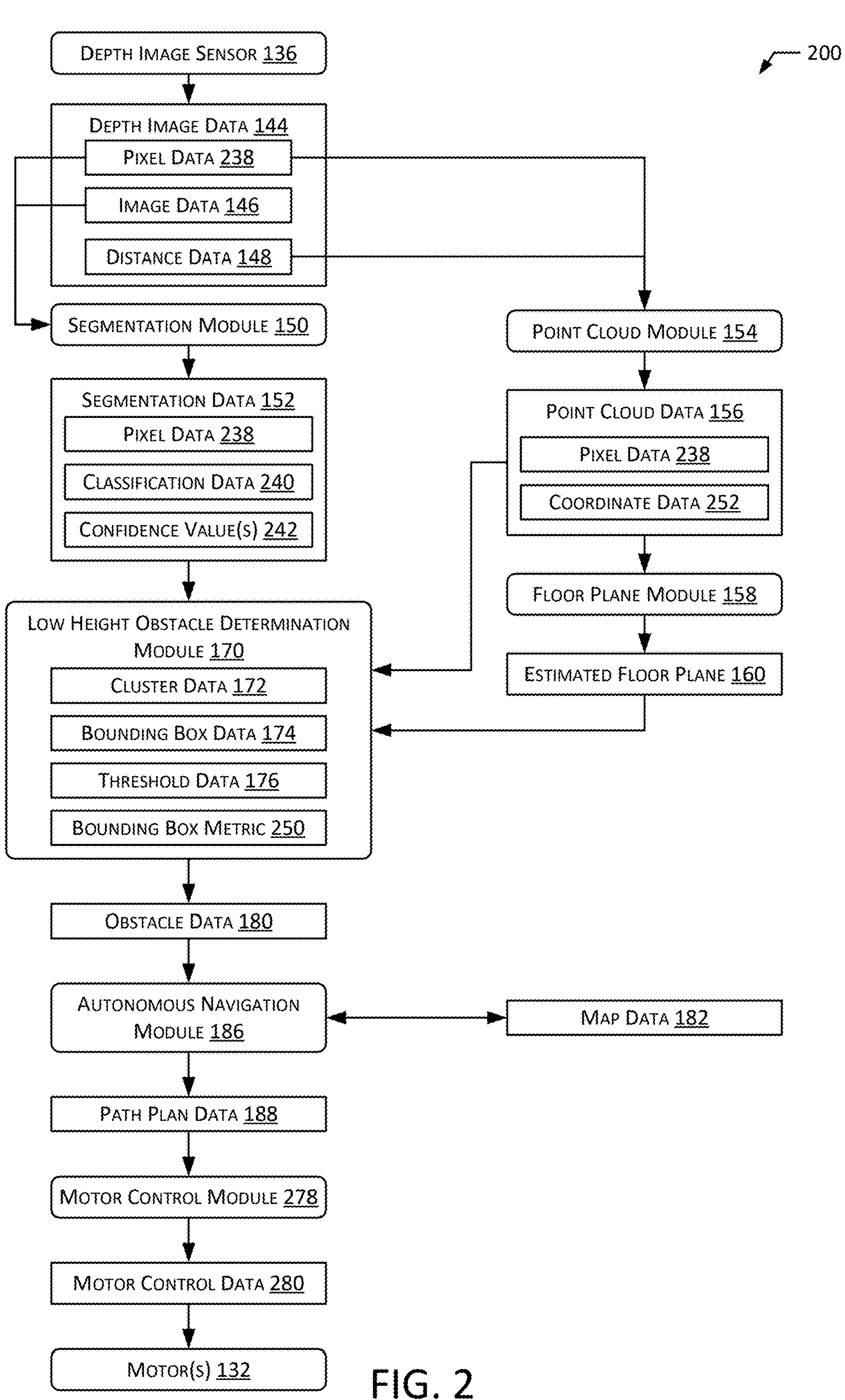
FIG. 2 illustrates a block diagram of the system, according to some implementations.

FIG. 2 illustrates at 200 a block diagram of the system 100, according to some implementations. A depth image sensor 136 provides as output depth image data 144 comprising image data 146 and distance data 148 and associated pixel data 238. The pixel data 238 may be indicative of a particular portion of one or more of the image data 146 and the distance data 148. For example, the pixel data 238 may indicate a row index value and column index value or other information indicative of a particular element within the array of data.

The image data 146 and the distance data 148 are associated with one another. In one implementation a one-to-one correspondence between the size of the image data 146 and the distance data 148 may result in a direct correspondence between pixel data 238 indicating a pixel in the image data 146 that corresponds to a particular row and column within the image data 146 and a pixel in the distance data 148 that corresponds to the same particular row and column within the distance data 148.

The image data 146 is provided as input to the segmentation module 150. In some implementations (not shown) the distance data 148 may be provided in addition to, or instead of, the image data 146 to the segmentation module 150.

The segmentation module 150 determines as output segmentation data 152 comprising pixel data 238 and associated classification data 240 and associated confidence values 242. In one implementation each pixel of the image data 146 may have associated classification data 240 and confidence value 242. In other implementations, a subset of the pixels of the image data 146 may be processed by the segmentation module 150.

The distance data 148 is provided as input to the point cloud module 154. In some implementations other data, such as localization data based on other sensor data 142 may be provided as input to the point cloud module 154. The localization data may be indicative of a location and orientation of the AMD 104 or a portion thereof with respect to a specified set of reference axes and datum. The point cloud module 154 determines point cloud data 156 as output. The point cloud data 156 may comprise the pixel data 238 and coordinate data 252. The coordinate data 252 is indicative of the coordinates, with respect to the specified set of reference axes, of a point indicated by the distance data 148.

In the implementation shown here, the floor plane module 158 may accept the point cloud data 156 as input and determine the estimated floor plane 160. For example, the floor plane module 158 may accept the point cloud data 156 and determine as output an estimated floor plane 160, e.g. a set of parameters a, b, c for a plane defined with a plane equation $ax+by+cz+d=0$. For example, the floor plane module 158 may use a random sample consensus (RANSAC) algorithm to process the point cloud data 156 or a portion of the point cloud data 156 to attempt to fit a plane to the data and determine the estimated floor plane 160.

In other implementations the estimated floor plane 160 may be determined based on the angle(s) of the depth image sensor 136 with respect to local vertical and previously stored information such as height of the depth image sensor 136 above a lowermost point of the wheels of the AMD 104, and so forth. For example, the depth image sensor 136 may include an accelerometer or tilt meter to determine the angle relative to local vertical, position encoders to provide data indicative of a position of the depth image sensor 136 relative to the body of the AMD 104, and so forth.

The LHO determination module 170 determines cluster data 172 and bounding box data 174 based on the segmentation data 152. Based on the point cloud data 156 and the estimated floor plane 160, a bounding box metric ("metric") 250 is determined for each bounding box. The metric 250 may be compared to a threshold value. Based on that comparison, the LHO determination module 170 may determine obstacle data 180 that is indicative of whether a portion of the physical space 102 is associated with an LHO 108 or a blocking obstacle 110. The operation of the LHO determination module 170 is discussed in more detail with regard to FIGS. 3-7.

The obstacle data 180 may be provided to the autonomous navigation module 186, a mapping module (not shown) or other modules. The autonomous navigation module 186 may include a path planning module that determines a path from one location in the physical space 102 to another. The path planning module may implement one or more path planning algorithms that determine path plan data 188 indicative of a path from a first location to a second location. The path planning module may implement one or more path planning algorithms to determine the path plan data 188. For example, the path planning module may implement the A* graph traversal and pathfinding algorithm as promulgated by Peter Hart, Nils Nilsson, and Bertram Raphael, the D* incremental search algorithm as promulgated by Anthony Stentz, or other algorithms. The path planning module may utilize one or more of the obstacle data 180 or map data 182 to determine the path. For example, prospective paths that would traverse a blocking object 110 may be disregarded, while prospective paths that traverse an LHO 108 may be permitted.

The path planning module may utilize a path plan cost to determine which prospective path plan data 188 to use to move the AMD 104. The prospective path plan data 188 with the lowest path plan cost may be selected for use. The path plan cost may be based on one or more characteristics of a path as indicated by the path plan data 188. The path plan cost may be based on one or more of a length of the path, a number of turns of the path, an estimated time to traverse the path, a number of segments in the path, a number of waypoints of the path, a number of doors that the path goes through, data representative of where people or pets are likely to be encountered along the path, and so forth. The path plan cost may comprise a sum of weighted values, with weights associated with each characteristic of a path. The larger the sum of these weighted values, the higher the path plan cost. For example, a straight line path that is 2 meters long and has no turns, such as moving straight ahead, may have a lower path plan cost than a rectangular path with four 90 degree turns that is also 2 meters long. In another example, a straight line path that is 2 meters long and has no turns and traverses an LHO 108 may have a higher path plan cost than the same path that does not traverse the LHO 108. In other implementations, other algorithms may be used to determine the path plan cost.

Once selected, the path plan data 188 may be provided to a motor control module 278. The motor control module 278 may use the path plan data 188 to determine one or more instances of motor control data 280 that is then used to operate the one or more motors 132 of a movement system. For example, the motor control data 280 may specify operating left and right wheel motors 132 at a specified rotation rate for a specified number of rotations.

While not shown in this figure for clarity, during operation the autonomous navigation module 186 may use sensor data 142. For example, the autonomous navigation module 186 may use sensor data 142 to determine current pose data indicative of a current location and orientation of the AMD 104 in the physical space 102 to determine if the AMD 104 is following the path indicated by the path plan data 188, adjust course to maintain that path, to perform collision avoidance of obstacles 110, to determine arrival at the destination, and so forth.

Once the AMD 104 arrives at the destination, the AMD 104 may perform one or more tasks or other operations.

In some implementations the functions associated with the modules may differ from those depicted in this figure. For example, in some implementations the point cloud module 154 and the floor plane module 158 may be combined.

Figure 3:
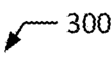
FIG. 3 illustrates depth image data used to determine low-height obstacles, according to some implementations.
Figure 3:
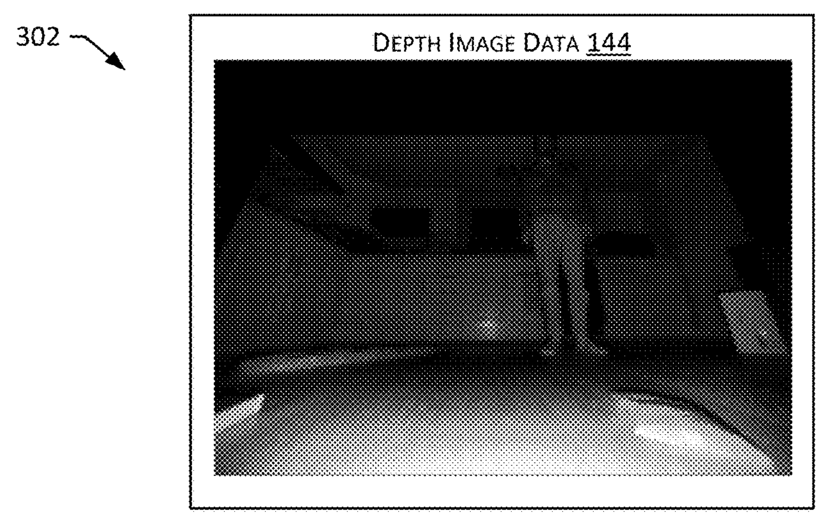
Figure 3:
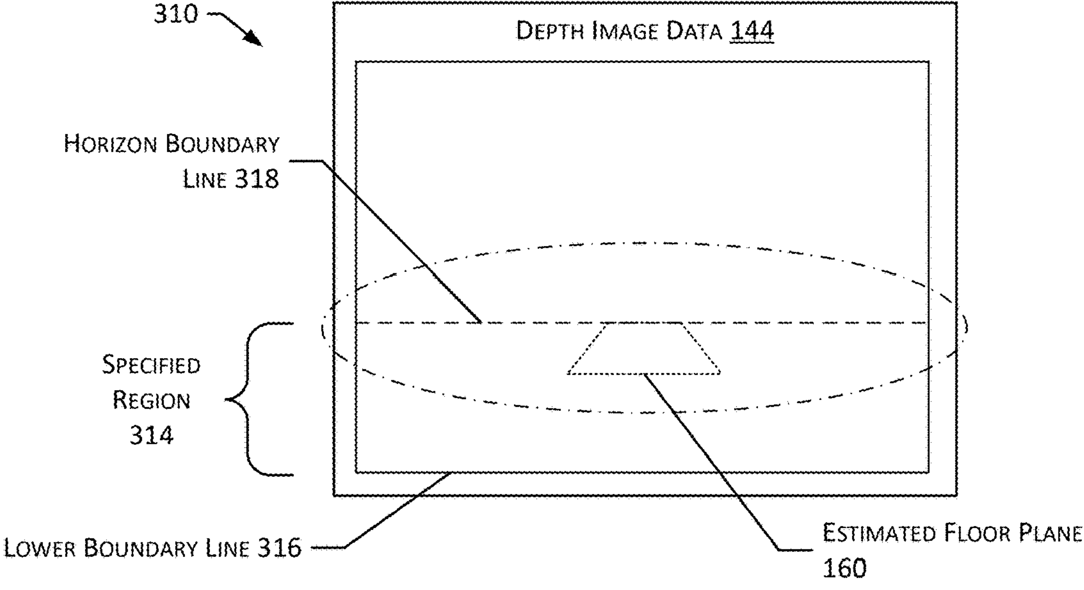

FIG. 3 illustrates at 300 an example of depth image data 144 used to determine low-height obstacles 108, according to some implementations. As described above, the depth image data 144 comprises image data 146 and distance data 148. For this and the following illustrations a one-to-one correspondence between pixels in the image data 146 and the distance data 148 is assumed. For ease of illustration, the image data 146 is shown in this figure.

At 302 an example of depth image data 144 of the physical space 102 is depicted.

At 310 elements that are associated with the depth image data 144 are shown. For clarity, the image data 146 has been removed at 310, leaving the elements.

A specified region 314 is indicative of a portion of the depth image data 144 that may be processed by the LHO determination module 170. In this implementation, the specified region 314 comprises rows of the depth image data 144 that extend from a lower boundary line 316 to a horizon boundary line 318. In this illustration, the lower boundary line 316 is the bottommost row of the depth image data 144. The location of the horizon boundary line 318 may be determined based at least in part on a relative location of the depth image sensor 136 and its orientation with respect to the physical space 102. In this illustration, the depth image sensor 136 is positioned such that its FOV 112 encompasses part of the floor 106 in front of and below the AMD 104 and a portion of the ceiling above and in front of the AMD 104. The horizon boundary line 318 may be selected to specify an upper bound, beyond which features depicted in the depth image data 144 are no longer deemed likely to be part of the floor 106 upon which the AMD 104 is supported. For example, the horizon boundary line 318 may be placed about ⅓ of the total height (or number of rows) of the depth image data 144 above the bottommost row of the depth image data 144. The location of the horizon boundary line 318 that is associated with local horizontal may also be determined based on the orientation of the depth image sensor 136 with respect to local vertical. In one implementation, based on data from an accelerometer or tilt sensor affixed to a structure of the AMD 104 and a position encoder that provides output that is indicative of the position of the depth image sensor 136 relative to the structure, the location of the horizon boundary line 318 may be determined. For example, as the depth image sensor 136 pans and tilts, and given the slope of the floor 106 as indicated by the tilt of the AMD 104 relative to vertical, the horizon boundary line 318 may be determined for each frame of depth image data 144.

In the implementation shown, the depth image sensor 136 is mounted such that the width of the depth image data 144 corresponds to the horizon of the physical space 102. In other implementations other mounting orientations of the depth image sensor 136 may be used. For example, the depth image sensor 136 may be rotated 90 degrees. The horizon boundary line 318 as described above may be aligned to correspond with a local horizon of the physical space 102.

Also depicted for illustration is a portion of the estimated floor plane 160.

Figure 4:
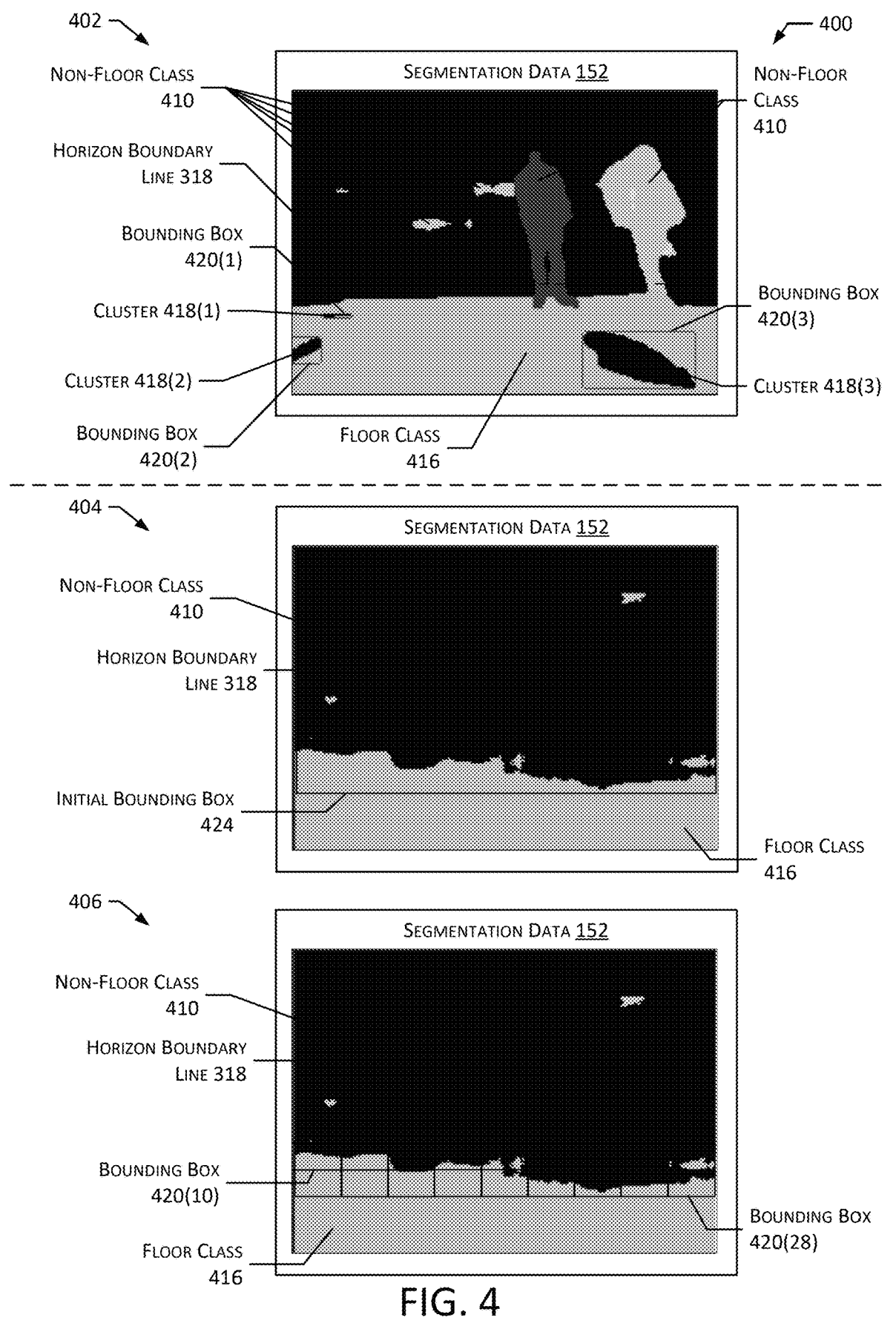

FIG. 4 illustrates at 400 clusters and bounding boxes of segmentation data 152, according to some implementations. The segmentation data 152 may be based on one or more of the image data 146 or the distance data 148, as described above.

At 402 segmentation data 152 is shown for a first scenario, such as that corresponding to FIGS. 1 and 3. Depicted is the horizon boundary line 318. Pixels corresponding to the non-floor class(es) 410 and floor class 416 are shown. In this scenario, pixels associated with the floor class 416 are located below the horizon boundary line 318, as are a few non-floor class 410 pixels.

Clusters 418(1)-(3) are depicted. These clusters 418 comprise "islands" or groups of non-floor class 410 pixels that are within floor class 416 pixels. For example, a cluster 418 may comprise a group of contiguous non-floor class 410 pixels that are bounded by pixels classified as floor class 416. For example, clusters 418(1) and 418(3) are entirely surrounded by non-floor class 410 pixels. Clusters 418 may also impinge on or be bounded at least in part by an edge of the array of data. For example, cluster 418(2) is bounded on one edge by the edge of the segmentation data 152 and bounded on the remaining sides by floor class 416 pixels.

In some implementations segmentation regions may be designated. For example, a segmentation region may comprise the floor class 416 pixels.

A bounding box 420 is determined for each cluster 418. For example, the bounding box 420 may comprise a rectangle that encompasses the cluster 418. In other implementations, other polygons or irregular shapes may be used for the bounding box 420.

In some implementations, the determination of clusters 418 and bounding boxes 420 may be performed only for the portion of the segmentation data 152 that is within the specified region 314.

At 404 segmentation data 152 is shown for a second scenario. Also depicted is the horizon boundary line 318. Pixels corresponding to the non-floor class(es) 410 and floor class 416 are shown. In this scenario, the non-floor class 410 impinges well below the horizon boundary line 318. For example, this may occur in situations such as the scene including forklift tines or other objects.

At 404 an initial bounding box 424 has been drawn that is bounded by the horizon boundary line 318 and the floor class 416 pixels. The initial bounding box 424 encompasses the entire width of the segmentation data 152 and is greater than a threshold maximum area. Bounding boxes that are larger than the threshold maximum area may result in classification of a relatively large portion of the physical space 102 as an obstacle. For example, the presence of an actual obstacle within a large bounding box may result in the entire area of the corresponding physical space 102 being designated as an obstacle. Continuing the example, the presence of a relatively large obstacle may impair the ability of the AMD 104 to move, blocking potential paths for autonomous movement. By limiting the size of the bounding boxes, such effects are reduced.

At 406 the second scenario continues, with the initial bounding box 424 having been divided into a plurality of bounding boxes 420(10)-(28). In the implementation shown, each of the plurality of bounding boxes 420 are of equal width and height. In other implementations a bounding box that exceeds a threshold area may be divided into unequal sized bounding boxes 420.

Once divided, the resulting bounding boxes 420(10)-(28) may be processed as described herein.

Figure 5:
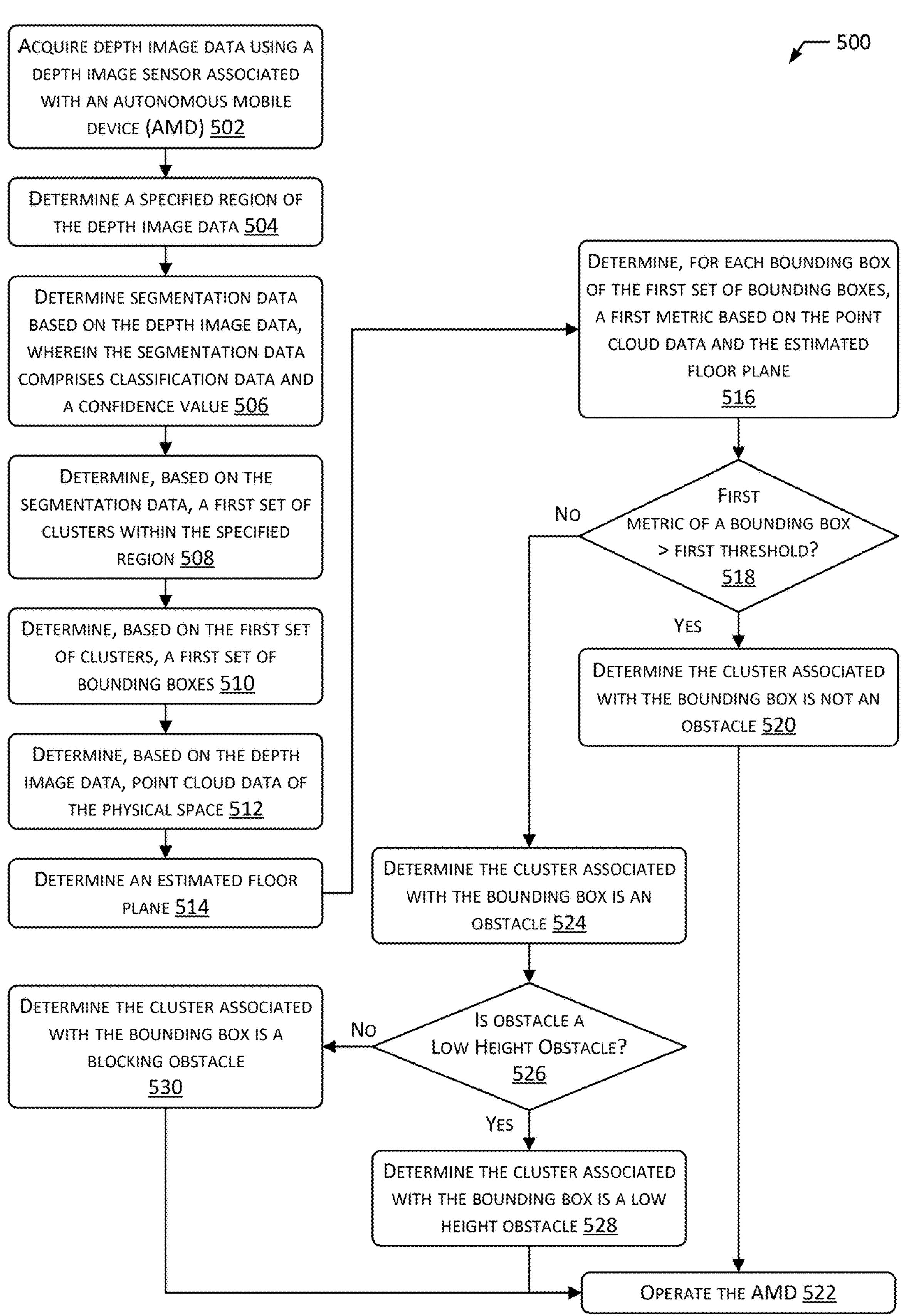
FIG. 5 is a flow diagram of a process for processing depth image data to determine a low-height obstacle and operating an AMD based on the low-height obstacle, according to some implementations.

FIG. 5 is a flow diagram 500 of a process for processing depth image data 144 to determine a low-height obstacle 108 and operating an AMD 104 based on the low-height obstacle 108, according to some implementations. In some implementations, the process may be executed using one or more of the processors 130 of the AMD 104.

At 502 depth image data 144 is acquired using a depth image sensor 136 associated with an AMD 104.

At 504 a specified region 314 of the depth image data 144 is determined. For example, the specified region 314 may be specified as the bottom ⅓ of the depth image data 144. In some implementations the specified region 314 may be determined based on one or more of the depth sensor FOV 112, location of the depth image sensor 136 with respect to the AMD 104, the orientation of the depth sensor FOV 112, and so forth.

At 506 segmentation data 152 is determined based on the depth image data 144. For example, the image data 146 may be processed by the segmentation module 150 to determine the segmentation data 152. The segmentation data 152 may comprise one or more of pixel data 238, classification data 240, and confidence values 242.

In some implementations, instead of depth image data 144, distance data 148 acquired by a depth image sensor 136 or another sensor 134 such as a LIDAR 922, or point cloud data 156 based on the distance data 148, may be used to determine the segmentation data 152. For example, the distance data 148 may be processed by the segmentation module 150 that has been trained to process distance data 148 or point cloud data 156 to determine the segmentation data 152. In such an implementation, the image data 146 may not be acquired, or may be disregarded.

At 508, based on the segmentation data 152, cluster data 172 indicative of a first set of clusters 418 are determined. In some implementations, the determination of the cluster data 172 may be limited to processing the portion of the segmentation data 152 that is within the specified region 314. This is discussed in more detail with regard to FIG. 6.

At 510 bounding box data 174 indicative of a first set of bounding boxes 420 is determined based on the first set of clusters 418. In some implementations, the determination of the bounding box data 174 may be limited to processing the portion of the first set of clusters 418 that are within the specified region 314. As described above, if a bounding box 420 is greater than a threshold area it may be divided into smaller bounding boxes 420. This is discussed in more detail with regard to FIG. 7.

At 512 point cloud data 156 representative of the physical space 102 is determined based on the depth image data 144. For example, the distance data 148 of the depth image data 144 may be processed by the point cloud module 154 to determine point cloud data 156. The point cloud data 156 may comprise pixel data 238 and coordinate data 252.

In the implementation shown, at 514 an estimated floor plane 160 is determined based on the point cloud data 156. For example, the point cloud data 156 may be processed by the floor plane module 158 to determine the estimated floor plane 160. In some implementations, those pixels that have been classified as being in the "floor" class 416 or their corresponding points and associated coordinates, may be used to determine the estimated floor plane 160. In the event that no plane is detected, the process may retrieve previous estimated floor plane data or previously acquired depth image data 144. For example, the system may determine a most recent floor plane estimate and then determine whether this most recent floor plane estimate was determined within a last configured number of frames (e.g. based on data for a frame of the last ten frames) or within a configured distance (e.g. based on data for a frame obtained when the device was within a configured distance of a current location). As another example, the previous ten frames of depth image data 144 may be processed in reverse order, most recent first, until an estimated floor plane 160 is detected.

In another implementation the estimated floor plane 160 may be determined based on other sensor data 142. For example, given tilt data obtained from an accelerometer unit or tilt sensor, and previously stored information about the shape of the AMD 104, the estimated floor plane 160 may be inferred.

At 516 for one or more bounding boxes 420 of the first set of bounding boxes 420 a respective bounding box metric ("metric") 250 is determined based on the point cloud data 156 and the estimated floor plane 160. In some implementations, a metric 250 may be calculated for each bounding box 420.

In one implementation, the metric 250 may be calculated as a ratio of a first count of points and a second count of points within the bounding box 420. Based on the bounding box 420 and the point cloud data 156, a first set of the plurality of points that are associated with pixels within the bounding box 420 are determined. Height data may be determined based on the point cloud data 156 and the estimated floor plane 160 that indicates the heights of points above the estimated floor plane 160. Based on the point cloud data 156 and the estimated floor plane 160, a first count of the points in the first set of points that are less than a first threshold height above the estimated floor plane 160 are determined. The first threshold height may be determined as the maximum height of an obstacle that the AMD 104 is able to safely traverse with little or no chance of being stopped. Based on the point cloud data 156 and the estimated floor plane 160, a second count of the points in the first set of points that are less than a second threshold height above the estimated floor plane 160 are determined. The second threshold height may be determined as the minimum height of an obstacle that the AMD 104 is unable to traverse. In some implementations the second threshold height is greater than the first threshold height. The metric 250 may then be determined by dividing the first count by the second count.

$$\text{metric} = \frac{L}{T}$$

where h=height of a point within the bounding box 420 with respect to the estimated floor plane 160

L=count of points within the bounding box 420 where h<a first threshold height T=count of points within the bounding box 420 where h<a second threshold height Equation 1

At 518 a determination is made as to whether the metric 250 associated with a bounding box 420, and corresponding cluster 418, is greater than a first threshold. If yes, the process proceeds to 520. The first threshold may be empirically determined. For example, the first threshold may have a value of "0.97".

At 520 the cluster 418 associated with the bounding box 420 is determined to not be an LHO 108 or a blocking obstacle 110. The portion of the physical space 102 that corresponds to the cluster 418 may contain an LHO 108 that is less than the first threshold height above the floor 106, or no obstacle at all. The process may then proceed to 522. For example, the autonomous navigation module 186 may determine path plan data 188 that comprises a path through the portion of the physical space 102 corresponding to the cluster 418 that contains no obstacle as indicated in the map data 182.

At 522 the AMD 104 is operated. With the portion of the physical space 102 that corresponds to the cluster 418 being deemed to have no obstacle, the map data 182 may be updated to indicate that no obstacle is present. As a result, the AMD 104 may be free to traverse that portion of the physical space 102.

Returning to 518, if the metric 250 associated with the bounding box 420, and the corresponding cluster 418, is not greater than the first threshold, the process proceeds to 524.

At 524 the portion of the physical space 102 that corresponds to the cluster 418 may be deemed to contain an obstacle, either an LHO 108 or a blocking obstacle 110.

At 526 a determination may be made as to whether the obstacle is an LHO 108 or a blocking obstacle 110. If yes, the process proceeds to 528. If no, the process proceeds to 530.

In one implementation, data may be obtained from another module. For example, another module may provide information about obstacles 110 that are above a certain height above the floor 106. This data may be used to make the determination at 526.

In another implementation, the data associated with the cluster 418 may be assessed to determine if the obstacle is greater than a threshold height. For example, k greatest heights above the floor 106 within the cluster 418 may be determined. If those k greatest heights are less than a third threshold value, the obstacle may be deemed to be an LHO 108. If greater than or equal to the third threshold value, the obstacle may be deemed to be a blocking obstacle 110.

At 528 the cluster 418 associated with the bounding box 420 is determined to be an LHO 108. The portion of the physical space 102 that corresponds to the cluster 418 may be deemed to contain the LHO 108. In some implementations the map data 182 may be updated to indicate the location and presence of the LHO 108. The process may then proceed to 522. For example, the autonomous navigation module 186 may determine path plan data 188 that comprises a path through the LHO 108 as indicated in the map data 182.

At 530 the cluster 418 associated with the bounding box 420 is determined to be a blocking obstacle 110. The portion of the physical space 102 that corresponds to the cluster 418 may be deemed to contain the blocking obstacle 110. In some implementations the map data 182 may be updated to indicate the location and presence of the blocking obstacle 110. The process may then proceed to 522. For example, the autonomous navigation module 186 may determine path plan data 188 that comprises a path that avoids the blocking obstacle 110 as indicated in the map data 182.

Figure 6:
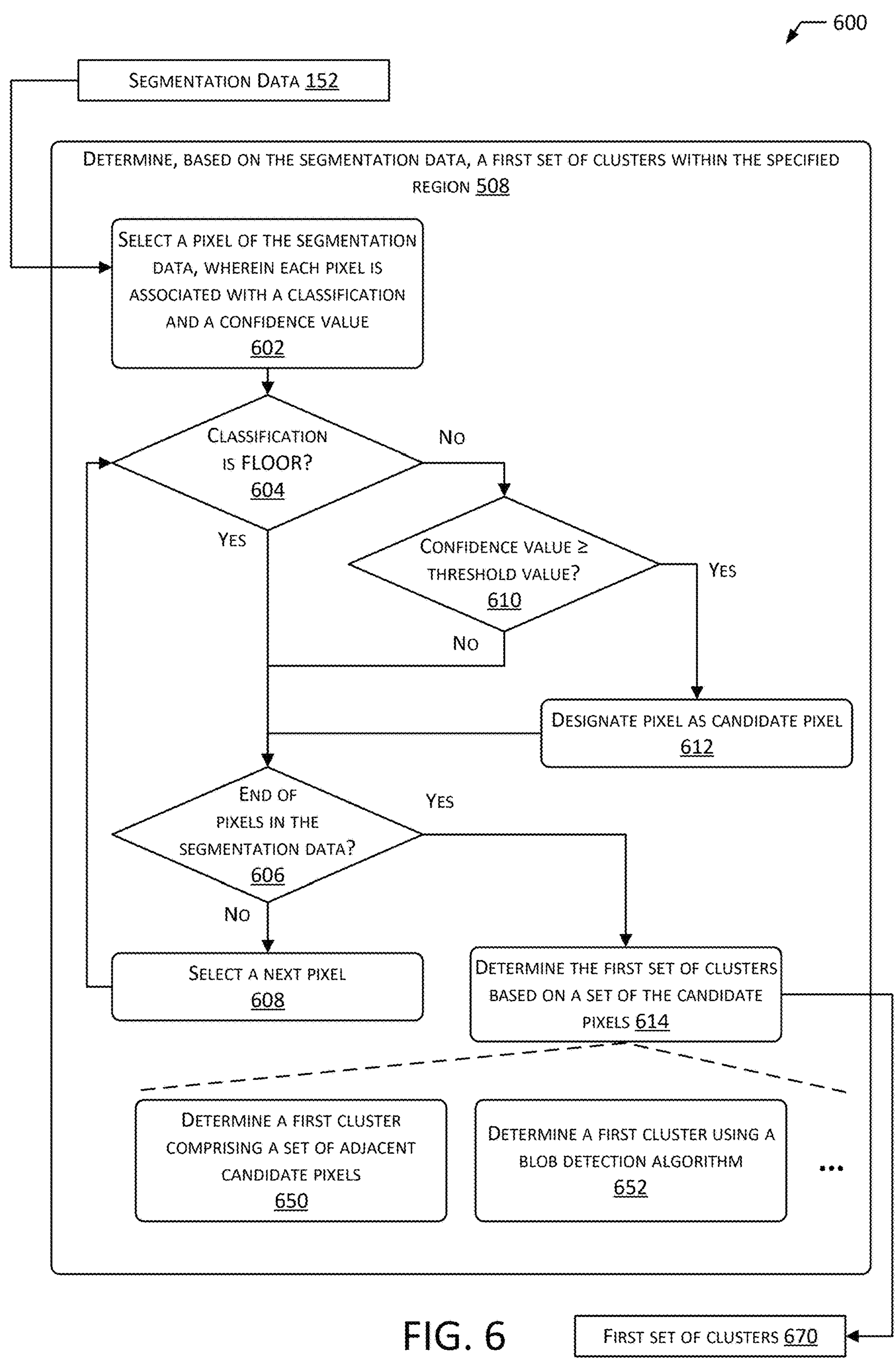
FIG. 6 is a flow diagram of a process for determining a set of clusters based on segmentation data, according to some implementations.

FIG. 6 is a flow diagram 600 of a process for determining a set of clusters 418 based on segmentation data 152, according to some implementations. In some implementations, the process may be executed using one or more of the processors 130 of the AMD 104.

At 602 a pixel of the segmentation data 152 is selected. Each pixel is specified by pixel data 238 and may be associated with classification data 240 and a confidence value 242. In some implementations that process may be performed on those pixels within the specified region 314.

At 604 a determination is made as to whether the pixel is associated with the classification of "floor". For example, does the classification data 240 indicate that the pixel is associated with the floor class 416? If yes, the process proceeds to 606. If no, the process proceeds to 610.

At 606 a determination is made as to whether the end of the pixels in the segmentation data 152 has been reached. As described, in some implementations that process may be performed on those pixels within the specified region 314. If no, the process proceeds to 608. If yes, the process proceeds to 614.

At 608 a next pixel of the segmentation data 152 is selected and the process continues to 604.

Returning to 604, if the pixel is classified as a class other than "floor", the process proceeds to 610. For example, if the pixel classification data 240 indicates that the pixel is associated with the non-floor class 410, the process proceeds to 610.

At 610 a determination is made as to whether the confidence value 242 is greater than or equal to a threshold value. If no, the process proceeds to 606. If yes, the process proceeds to 612. The threshold value may be determined empirically.

At 612 the pixel is designated as a candidate pixel, and the process proceeds to 606.

Returning to 606, if the end of the pixels in the segmentation data 152 has been reached, the process proceeds to 614. At 614 a first set of clusters 670 are determined based on a set of the candidate pixels.

In one implementation shown at 650, a first cluster 418 comprising a set of adjacent or contiguous candidate pixels is determined. For example, the set of candidate pixels that are adjacent to at least one other candidate pixel may be designated as a cluster 418. In some implementations a first cluster 418 may comprise the set of adjacent or contiguous pixels that are surrounded or bounded by a pixel associated with the "floor" class 416 or an edge of the segmentation data 152.

In one implementation shown at 652, the first cluster 418 may be determined using a blob detection algorithm. For example, the candidate pixels may be used to generate a binary image having the same dimensions as the segmentation data 152. Candidate pixels may be assigned a value of "1" and non-candidate pixels may be assigned a value of "0". The binary image may then be processed to determine clusters 418 using the OpenCV function "SimpleBlobDetector" as promulgated at OpenCV.org.

Figure 7:
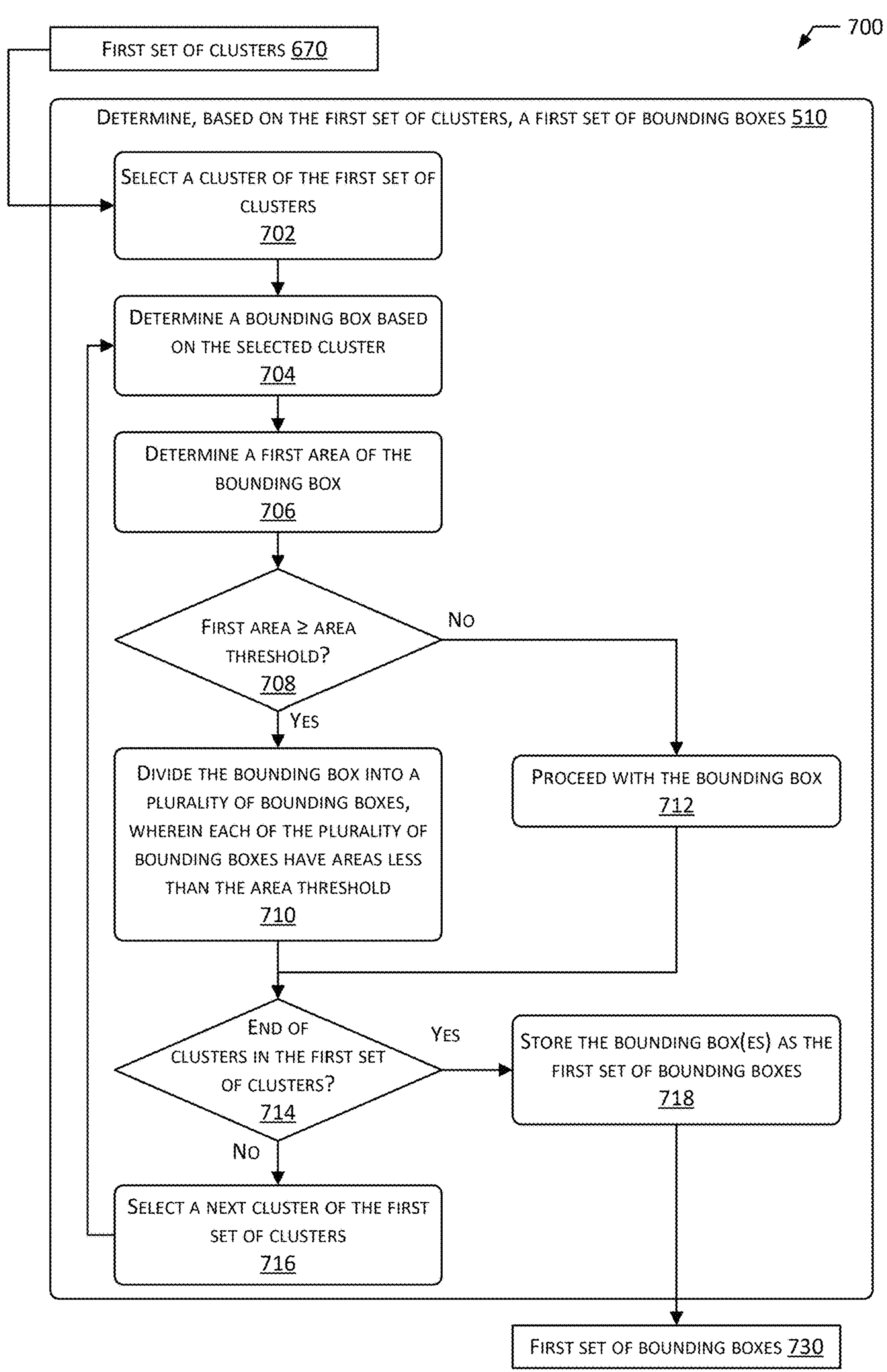
FIG. 7 is a flow diagram of a process for determining a set of bounding boxes based on segmentation data, according to some implementations.

FIG. 7 is a flow diagram 700 of a process for determining a set of bounding boxes 420 based on segmentation data 152, according to some implementations. In some implementations, the process may be executed using one or more of the processors 130 of the AMD 104.

The first set of clusters 670 are provided as input. Each cluster 420 within the first set of clusters 670 may be processed as described with respect to operation 702 through 712.

At 702 a cluster 418 of the first set of clusters 670 is selected. For example, a cluster 418 may be selected based on an index number or identifier that is associated with the cluster 418. In another example, the cluster 418 may be selected based on size.

At 704 a bounding box 420, such as the initial bounding box 424, is determined based on the selected cluster 418.

At 706 a first area of the bounding box 420 is determined. For example, the area may be calculated based on the width of the bounding box 420 multiplied by the height of the bounding box 420 as pixels.

At 708 a determination is made as to whether the first area is greater than or equal to an area threshold. If yes, the process proceeds to 710. If no, the process proceeds to 712. The area threshold may be empirically determined. For example, the area threshold may be specified as 100 pixels. This determination may be used to avoid classification of relatively large portions of the physical space 102 as an obstacle which may impair path planning. For example, an actual obstacle in the physical space 102 such as a ball may cast a shadow. This ball and its shadow may produce a large cluster 418 with a correspondingly large bounding box 420. If this large bounding box 420 was determined to represent an obstacle, a large portion of the physical space 102 would be marked as an obstacle in the map data 182, resulting in the AMD 104 needlessly moving around this space to avoid an obstacle that does not exist. In some cases, this may prevent movement. For example, if the map data 182 contains many large obstacles that do not actually exist, or for which their size on the map has been inflated, the autonomous navigation module 186 may be unable to determine a path to a destination due to the blocking of those obstacles.

In other implementations other attributes, such as a length, width, aspect ratio, and so forth of the bounding box 420 may be compared, instead of or in addition to the area at 708.

In some implementations a minimum area threshold may be specified in addition to the maximum area threshold. For example, a minimum bounding box size may be specified and used.

At 710 the bounding box 420, such as the initial bounding box 424, is divided into a plurality of bounding boxes 420(1)-(P). Each bounding box 420 of the plurality of bounding boxes 420 has an area that is less than the area threshold. In one implementation the division may be done using a fixed divisor, such as dividing the initial bounding box 424 by k, where k is a non-zero integer. In another implementation the initial bounding box 424 may be divided using a predetermined minimum size bounding box 420. For example, a minimum bounding box size of 50 pixels by 100 pixels may be specified and used to divide the initial bounding box 424 in the plurality of bounding boxes 420, with any remainder comprising a separate bounding box 420.

At 712 the first bounding box 420 is used without modification and the bounding box 420 is added to a first set of bounding boxes 730.

At 714 a determination is made as to whether the end of the clusters 418 in the first set of clusters 670 has been reached. In some implementations that process may be performed on those clusters 418, or portions thereof, that are within the specified region 314. If no, the process proceeds to 716. If yes, the process proceeds to 718.

At 716 a next cluster 418 of the first set of clusters 670 is selected and the process continues to 704.

At 718 the bounding box(es) 420 are stored as the first set of bounding boxes 730.

FIG. 8 is a block diagram 800 of a mobile robotic device such as the AMD 104, according to some implementations. The AMD 104 may include one or more batteries 128 to provide electrical power suitable for operating the components in the AMD 104. In some implementations, other devices may be used to provide electrical power to the AMD 104. For example, power may be provided by wireless power transfer, capacitors, fuel cells, storage flywheels, and so forth.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

The AMD 104 may include one or more motors 132, actuators, or other devices to cause the AMD 104 or a portion thereof to move. For example, the one or more motors 132 may operate one or more wheels, legs, and so forth to move the AMD 104 from a first location in the physical space 102 to a second location in the physical space 102.

One or more clocks 802 may provide information indicative of date, time, ticks, and so forth. For example, the processor 130 may use data from the clock 802 to associate a particular time with an action, sensor data 142, and so forth.

The AMD 104 may include one or more communication interfaces 804 such as input/output (I/O) interfaces 806, network interfaces 808, and so forth. The communication interfaces 804 enable the AMD 104, or components thereof, to communicate with other devices 198 or components. The communication interfaces 804 may include one or more I/O interfaces 806. The I/O interfaces 806 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 806 may couple to one or more I/O device 810. The I/O device 810 may include input devices such as one or more of a sensor 134, keyboard, mouse, scanner, and so forth. The I/O device 810 may also include output devices 812 such as one or more of a motor 132, light, speaker, display, projector, printer, and so forth. In some embodiments, the I/O devices 810 may be physically incorporated with the AMD 104 or may be externally placed. The sensors 134 and I/O devices 810 are discussed in more detail with regard to FIG. 9.

The AMD 104 may include one or more network interfaces 808. The network interfaces 808 may include devices to connect to personal area networks (PANs), local area networks (LANs), wireless local area networks (WLANS), wide area networks (WANs), and so forth. For example, the network interfaces 808 may include devices compatible with Ethernet, Wi-Fi, Bluetooth, Bluetooth Low Energy, ZigBee, and so forth.

The AMD 104 includes one or more memories 140. The memory 140 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 140 provides storage of computer-readable instructions, data structures, program modules, and other data for the operation of the AMD 104.

A few example functional modules are shown stored in the memory 140, although the same functionality may alternatively be implemented in hardware, firmware, or as a system on a chip (SoC).

The memory 140 may include at least one operating system (OS) module 814. The OS module 814 is configured to manage hardware resource devices such as the I/O interfaces 806, the I/O devices 810, the communication interfaces 804, and provide various services to applications or modules executing on the processors 130. The OS module 814 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 140 may be a data store 880 and one or more of the following modules. These modules may be executed as foreground applications, background tasks, daemons, and so forth. The data store 880 may use a flat file, database, linked list, tree, executable code, script, or other data structure to store information. In some implementations, the data store 880 or a portion of the memory 140 may be distributed across one or more other devices 198 including other AMDs 104, servers 196, network attached storage devices, and so forth.

A communication module 816 may be configured to establish communication with other devices 198, such as other AMDs 104, an external server 196, a docking station 194, and so forth. The communications may be authenticated, encrypted, and so forth.

Other modules within the memory 140 may include a safety module 818, the segmentation module 150, the point cloud module 154, the floor plane module 158, the LHO determination module 170, the autonomous navigation module 186, a speech processing module 822, one or more task modules 830, or other modules 834. The modules may access memory within the data store 880, including safety tolerance data 836, sensor data 142, input data 846, the point cloud data 156, the estimated floor plane 160, the threshold data 176, the map data 182, the path plan data 188, other data 850, and so forth.

The safety module 818 may access the safety tolerance data 836 to determine within what tolerances the AMD 104 may operate safely within the physical space 102. For example, the safety module 818 may be configured to stop the AMD 104 from moving when an extensible mast of the AMD 104 is extended. In another example, the safety tolerance data 836 may specify a minimum sound threshold which, when exceeded, stops all movement of the AMD 104. Continuing this example, detection of sound such as a human yell would stop the AMD 104. In another example, the safety module 818 may access safety tolerance data 836 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 132, issuing a command to stop motor operation, disconnecting power from one or more the motors 132, and so forth. The safety module 818 may be implemented as hardware, software, or a combination thereof.

The safety module 818 may control other factors, such as a maximum speed of the AMD 104 based on information obtained by the sensors 134, precision and accuracy of the sensor data 142, and so forth. For example, detection of an object by an optical sensor may include some error, such as when the distance to the object comprises a weighted average between the object and a background. As a result, the maximum speed permitted by the safety module 818 may be based on one or more factors such as the weight of the AMD 104, nature of the floor 106, distance to the object, and so forth. In the event that the maximum permissible speed differs from the maximum speed permitted by the safety module 818, the lesser speed may be utilized.

The speech processing module 822 may be used to process utterances of the user 114. Microphones may acquire audio in the presence of the AMD 104 and may send raw audio data 838 to an acoustic front end (AFE). The AFE may transform the raw audio data 838 (for example, a single-channel, 16-bit audio stream sampled at 16 kHz), captured by the microphone, into audio feature vectors 824 that may ultimately be used for processing by various components, such as a wakeword detection module 826, speech recognition engine, or other components. The AFE may reduce noise in the raw audio data 838. The AFE may also perform acoustic echo cancellation (AEC) or other operations to account for output audio data that may be sent to a speaker of the AMD 104 for output. For example, the AMD 104 may be playing music or other audio that is being received from a network 192 in the form of output audio data. To avoid the output audio interfering with the device's ability to detect and process input audio, the AFE or other component may perform echo cancellation to remove the output audio data from the input raw audio data 838, or other operations.

The AFE may divide the raw audio data 838 into frames representing time intervals for which the AFE determines a number of values (i.e., features) representing qualities of the raw audio data 838, along with a set of those values (i.e., a feature vector or audio feature vector 824) representing features/qualities of the raw audio data 838 within each frame. A frame may be a certain period of time, for example a sliding window of 85 ms of audio data 828 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 838, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 824 (or the raw audio data 838) may be input into a wakeword detection module 826 that is configured to detect keywords spoken in the audio. The wakeword detection module 826 may use various techniques to determine whether audio data 828 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 826 to perform wakeword detection to determine when a user 114 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 826 may compare audio data 828 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 828 (which may include one or more of the raw audio data 838 or the audio feature vectors 824) to one or more server(s) 196 for speech processing. The audio data 828 corresponding to audio obtained by the microphone may be processed locally on one or more of the processors 130, sent to a server 196 for routing to a recipient device or may be sent to the server 196 for speech processing for interpretation of the included speech (either for purposes of enabling voice-communications and/or for purposes of executing a command in the speech). The audio data 828 may include data corresponding to the wakeword, or the portion of the audio data 828 corresponding to the wakeword may be removed by the AMD 104 before processing by the speech processing module 822, prior to sending to the server 196, and so forth.

The speech processing module 822 may include or access an automated speech recognition (ASR) module. The ASR module may accept as input raw audio data 838, audio feature vectors 824, or other sensor data 142 and so forth and may produce as output the input data 846 comprising a text string or other data representation. The input data 846 comprising the text string or other data representation may be processed by the speech processing module 822 to determine the command to be executed. For example, the utterance of the command "robot, come here" may result in input data 846 comprising the text string "come here". The wakeword "robot" may be omitted from the input data 846.

The AMD 104 may move responsive to a determination made by an onboard processor 130, in response to a command received from one or more communication interfaces 804, as determined from the sensor data 142, and so forth. For example, an external server 196 may send a command that is received using the network interface 808. This command may direct the AMD 104 to proceed to find a particular user 114, follow a particular user 114, and so forth. The AMD 104 may then process this command and use the autonomous navigation module 186 to determine the directions and distances associated with carrying out the command. For example, the command to "come here" may result in the task module 830 sending a command to the autonomous navigation module 186 to move the AMD 104 to a particular location near the user 114 and orient the AMD 104 in a particular direction.

The AMD 104 may connect to the network 192 using one or more of the network interfaces 808. In some implementations, one or more of the modules or other functions described here may execute on the processors 130 of the AMD 104, on the server 196, or a combination thereof. For example, one or more servers 196 may provide various functions, such as ASR, natural language understanding (NLU), providing content such as audio or video to the AMD 104, and so forth.

The other modules 834 may provide other functionality, such as object recognition, speech synthesis, user identification, and so forth. The other modules 834 may comprise a speech synthesis module that is able to convert text data to human speech. For example, the speech synthesis module may be used by the AMD 104 to provide speech that a user 114 is able to understand.

The data store 880 may store the other data 850 as well. For example, localization settings may indicate local preferences such as language, user identifier data may be stored that allows for identification of a particular user 114, and so forth.

Modules described herein, such as the LHO determination module 170, may provide various processing functions such as de-noising, filtering, and so forth. Processing of sensor data 142, such as image data 146 from a camera, may be performed by a module implementing, at least in part, one or more of the following tools or techniques. In one implementation, processing of image data 146 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 142. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 142 or other data. For example, the ANN may be trained using a supervised learning algorithm such that object identifiers are associated with images of particular objects within training images provided to the ANN. Once trained, the ANN may be provided with the sensor data 142 and produce output indicative of the object identifier.

FIG. 9 is a block diagram 900 of some components of the AMD 104 such as network interfaces 808, sensors 134, and output devices 812, according to some implementations. The components illustrated here are provided by way of illustration and not necessarily as a limitation. For example, the AMD 104 may utilize a subset of the particular network interfaces 808, output devices 812, or sensors 134 depicted here, or may utilize components not pictured. One or more of the sensors 134, output devices 812, or a combination thereof may be included on a moveable component that may be panned, tilted, rotated, or any combination thereof with respect to a chassis of the AMD 104.

The network interfaces 808 may include one or more of a WLAN interface 902, PAN interface 904, secondary radio frequency (RF) link interface 906, or other interface 908. The WLAN interface 902 may be compliant with at least a portion of the Wi-Fi specification. For example, the WLAN interface 902 may be compliant with at least a portion of the IEEE 902.11 specification as promulgated by the Institute of Electrical and Electronics Engineers (IEEE). The PAN interface 904 may be compliant with at least a portion of one or more of the Bluetooth, wireless USB, Z-Wave, ZigBee, or other standards. For example, the PAN interface 904 may be compliant with the Bluetooth Low Energy (BLE) specification.

The secondary RF link interface 906 may comprise a radio transmitter and receiver that operate at frequencies different from or using modulation different from the other interfaces. For example, the WLAN interface 902 may utilize frequencies in the 8.4 GHz and 5 GHz Industrial Scientific and Medicine (ISM) bands, while the PAN interface 904 may utilize the 8.4 GHz ISM bands. The secondary RF link interface 906 may comprise a radio transmitter that operates in the 900 MHZ ISM band, within a licensed band at another frequency, and so forth. The secondary RF link interface 906 may be utilized to provide backup communication between the AMD 104 and other devices 198 in the event that communication fails using one or more of the WLAN interface 902 or the PAN interface 904. For example, in the event the AMD 104 travels to an area within the physical space 102 that does not have Wi-Fi coverage, the AMD 104 may use the secondary RF link interface 906 to communicate with another device such as a specialized access point, docking station 194, or other AMD 104.

The other 908 network interfaces may include other equipment to send or receive data using other wavelengths or phenomena. For example, the other 908 network interface may include an ultrasonic transceiver used to send data as ultrasonic sounds, a visible light system that communicates by modulating a visible light source such as a light-emitting diode, and so forth. In another example, the other 908 network interface may comprise a wireless wide area network (WWAN) interface or a wireless cellular data network interface. Continuing the example, the other 908 network interface may be compliant with at least a portion of the LTE, 5G, 6G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

The sensors 134 include the depth image sensor 136. In some implementations the depth image sensor 136 may comprise a plurality of sensors 134. For example, the depth image sensor 136 may comprise a high-resolution LIDAR 922 and a camera 944, with the output from each aligned or registered to one another.

A motor encoder 910 provides information indicative of the rotation or linear extension of a motor 132. The motor 132 may comprise a rotary motor, or a linear actuator. In some implementations, the motor encoder 910 may comprise a separate assembly such as a photodiode and encoder wheel that is affixed to the motor 132. In other implementations, the motor encoder 910 may comprise circuitry configured to drive the motor 132. For example, the autonomous navigation module 186 may utilize the data from the motor encoder 910 to estimate a distance traveled.

A suspension weight sensor 912 provides information indicative of the weight of the AMD 104 on the suspension system for one or more of the wheels or the caster. For example, the suspension weight sensor 912 may comprise a switch, strain gauge, load cell, photodetector 942, or other sensing element that is used to determine whether weight is applied to a particular wheel, or whether weight has been removed from the wheel. In some implementations, the suspension weight sensor 912 may provide binary data such as a "1" value indicating that there is a weight applied to the wheel, while a "0" value indicates that there is no weight applied to the wheel. In other implementations, the suspension weight sensor 912 may provide an indication such as so many kilograms of force or newtons of force. The suspension weight sensor 912 may be affixed to one or more of the wheels or the caster. In some situations, the safety module 818 may use data from the suspension weight sensor 912 to determine whether or not to inhibit operation of one or more of the motors 132. For example, if the suspension weight sensor 912 indicates no weight on the suspension, the implication is that the AMD 104 is no longer resting on its wheels, and thus operation of the motors 132 may be inhibited. In another example, if the suspension weight sensor 912 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 914 provide an indication of physical contact between a bumper or other member that is in mechanical contact with the bumper switch 914. The safety module 818 utilizes sensor data 142 obtained by the bumper switches 914 to modify the operation of the AMD 104. For example, if the bumper switch 914 associated with a front of the AMD 104 is triggered, the safety module 818 may drive the AMD 104 backwards.

A floor optical motion sensor (FOMS) 916 provides information indicative of motion of the AMD 104 relative to the floor 106 or other surface underneath the AMD 104. In one implementation, the FOMS 916 may comprise a light source such as light-emitting diode (LED), an array of photodiodes, and so forth. In some implementations, the FOMS 916 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 916 may provide other information, such as data indicative of a pattern present on the floor 106, composition of the floor 106, color of the floor 106, and so forth. For example, the FOMS 916 may utilize an optoelectronic sensor that may detect different colors or shades of gray, and this data may be used to generate floor characterization data. The floor characterization data may be used for navigation.

An ultrasonic sensor 918 utilizes sounds in excess of 80 kHz to determine a distance from the sensor 134 to an object. The ultrasonic sensor 918 may comprise an emitter such as a piezoelectric transducer and a detector such as an ultrasonic microphone. The emitter may generate specifically timed pulses of ultrasonic sound while the detector listens for an echo of that sound being reflected from an object within the field-of-view. The ultrasonic sensor 918 may provide information indicative of a presence of an object, distance to the object, and so forth. Two or more ultrasonic sensors 918 may be utilized in conjunction with one another to determine a location within a two-dimensional plane of the object.

In some implementations, the ultrasonic sensor 918 or a portion thereof may be used to provide other functionality. For example, the emitter of the ultrasonic sensor 918 may be used to transmit data and the detector may be used to receive data transmitted that is ultrasonic sound. In another example, the emitter of an ultrasonic sensor 918 may be set to a particular frequency and used to generate a particular waveform such as a sawtooth pattern to provide a signal that is audible to an animal, such as a dog or a cat.

An optical sensor 920 may provide sensor data 142 indicative of one or more of a presence or absence of an object, a distance to the object, or characteristics of the object. The optical sensor 920 may use a direct or indirect time-of-flight (ToF) approach, a structured light approach, interferometry, or other techniques to generate the distance data. For example, a direct ToF approach determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. An indirect ToF approach involves emitting modulated light and determining a phase shift between emitted and received light to estimate distance (e.g. utilizing pixels that are configured to accumulate charge from a photodiode for a first period in sync with an emitter in a first well and accumulate charge from a photodiode for a second period out of sync with the emitter in a second well and then calculate a phase shift of returning signal based on a proportion between the wells, preferably after this has been repeated for some period to allow for sufficient charge accumulation over a configured integration time). The optical sensor 920 may utilize one or more sensing elements. For example, the optical sensor 920 may comprise a 4×4 array of light sensing elements. Each individual sensing element may be associated with a field-of-view (FOV) that is directed in a different way. For example, the optical sensor 920 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 134 such as an image sensor or camera 944. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 920 may operate as a depth camera, providing a two-dimensional image of a scene, as well as data that indicates a distance to each pixel.

Data from the optical sensors 920 may be utilized for collision avoidance. For example, the safety module 818 and the autonomous navigation module 186 may utilize the sensor data 142 indicative of the distance to an object in order to prevent a collision with that object.

Multiple optical sensors 920 may be operated such that their FOVs overlap at least partially. To minimize or eliminate interference, the optical sensors 920 may selectively control one or more of the timing, modulation, or frequency of the light emitted. For example, a first optical sensor 920 may emit light modulated at 90 kHz while a second optical sensor 920 emits light modulated at 93 kHz.

A lidar 922 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 142 may be generated that is indicative of the presence of objects and the relative positions, shapes, and so forth that are visible to the lidar 922. Data from the lidar 922 may be used by various modules. For example, the autonomous navigation module 186 may utilize point cloud data 156 generated by the lidar 922 for localization of the AMD 104 within the physical space 102.

The AMD 104 may include an extensible mast. A mast position sensor 924 provides information indicative of a position of the mast of the AMD 104. For example, the mast position sensor 924 may comprise limit switches associated with the mast extension mechanism that indicate whether the mast is at an extended or retracted position. In other implementations, the mast position sensor 924 may comprise an optical code on at least a portion of the mast that is then interrogated by an optical emitter and a photodetector 942 to determine the distance to which the mast is extended. In another implementation, the mast position sensor 924 may comprise an encoder wheel that is attached to a mast motor that is used to raise or lower the mast. The mast position sensor 924 may provide data to the safety module 818. For example, if the AMD 104 is preparing to move, data from the mast position sensor 924 may be checked to determine if the mast is retracted, and if not, the mast may be retracted prior to beginning movement.

A mast strain sensor 926 provides information indicative of a strain on the mast with respect to the remainder of the AMD 104. For example, the mast strain sensor 926 may comprise a strain gauge or load cell that measures a side-load applied to the mast, a weight on the mast, or downward pressure on the mast. The safety module 818 may utilize sensor data 142 obtained by the mast strain sensor 926. For example, if the strain applied to the mast exceeds a threshold amount, the safety module 818 may direct an audible and visible alarm to be presented by the AMD 104.

The AMD 104 may include a modular payload bay. A payload weight sensor 928 provides information indicative of the weight associated with the modular payload bay. The payload weight sensor 928 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 928 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 928 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 818 may utilize the payload weight sensor 928 to determine if the modular payload bay has been overloaded. If so, an alert or notification may be issued.

One or more temperature sensors 930 may be utilized by the AMD 104. The temperature sensors 930 provide temperature data of one or more components within the AMD 104. For example, a temperature sensor 930 may indicate a temperature of one or more of the batteries 128, one or more motors 132, and so forth. In the event the temperature exceeds a threshold value, the component associated with that temperature sensor 930 may be shut down. For example, the threshold value may be determined based on component specifications, such as a maximum permissible temperature of the batteries 128.

One or more interlock sensors 932 may provide data to the safety module 818 or other circuitry that prevents the AMD 104 from operating in an unsafe condition. For example, the interlock sensors 932 may comprise switches that indicate whether an access panel is open. The interlock sensors 932 may be configured to inhibit operation of the AMD 104 until the interlock switch indicates a safe condition is present.

A gyroscope 934 may provide information indicative of rotation of an object affixed thereto. For example, a gyroscope 934 may generate sensor data 142 that is indicative of a change in orientation of the AMD 104 or a portion thereof.

An accelerometer 936 provides information indicative of a direction and magnitude of an imposed acceleration. Data such as rate of change, determination of changes in direction, speed, and so forth may be determined using the accelerometer 936. The accelerometer 936 may comprise mechanical, optical, micro-electromechanical, or other devices. For example, the gyroscope 934 in the accelerometer 936 may comprise a prepackaged solid-state inertial measurement unit (IMU) that provides multiple axis gyroscopes 934 and accelerometers 936.

A magnetometer 938 may be used to determine an orientation by measuring ambient magnetic fields, such as the terrestrial magnetic field. For example, the magnetometer 938 may comprise a Hall effect transistor that provides output compass data indicative of a magnetic heading.

The AMD 104 may include one or more location sensors 940. The location sensors 940 may comprise an optical, radio, or other navigational system such as a global navigation satellite system (GNSS) receiver such as a global positioning system (GPS). For indoor operation, the location sensors 940 may comprise indoor position systems, such as using Wi-Fi Positioning Systems (WPS). The location sensors 940 may provide information indicative of a relative location, such as "living room" or an absolute location such as particular coordinates indicative of latitude and longitude, or displacement with respect to a predefined origin.

A photodetector 942 provides sensor data 142 indicative of impinging light. For example, the photodetector 942 may provide data indicative of a color, intensity, duration, and so forth.

A camera 944 generates sensor data 142 indicative of one or more images. The camera 944 may be configured to detect light in one or more wavelengths including, but not limited to, terahertz, infrared, visible, ultraviolet, and so forth. For example, an infrared camera 944 may be sensitive to wavelengths between approximately 800 nanometers and 1 millimeter. The camera 944 may comprise charge coupled devices (CCD), complementary metal oxide semiconductor (CMOS) devices, microbolometers, and so forth. The AMD 104 may use image data 146 acquired by the camera 944 for object recognition, navigation, collision avoidance, user communication, and so forth. For example, a pair of cameras 944 sensitive to infrared light may be mounted on the front of the AMD 104 to provide binocular stereo vision, with the sensor data 142 comprising images being sent to the autonomous navigation module 186. In another example, the camera 944 may comprise a 10 megapixel or greater camera that is used for videoconferencing or for acquiring pictures for the user 114.

The camera 944 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 944, particularly those associated with navigation or autonomous operation, may utilize a global shutter. In other implementations, the camera(s) 944 providing images for use by the autonomous navigation module 186 may be acquired using a rolling shutter and subsequently may be processed to mitigate image artifacts.

One or more microphones 946 may be configured to acquire information indicative of sound present in the physical space 102. In some implementations, arrays of microphones 946 may be used. These arrays may implement beamforming techniques to provide for directionality of gain. The AMD 104 may use the one or more microphones 946 to acquire information from acoustic tags, accept voice input from users 114, determine a direction of an utterance, determine ambient noise levels, for voice communication with another user 114 or system, and so forth.

An air pressure sensor 948 may provide information indicative of an ambient atmospheric pressure or changes in ambient atmospheric pressure. For example, the air pressure sensor 948 may provide information indicative of changes in air pressure due to opening and closing of doors, weather events, and so forth.

An air quality sensor 950 may provide information indicative of one or more attributes of the ambient atmosphere. For example, the air quality sensor 950 may include one or more chemical sensing elements to detect the presence of carbon monoxide, carbon dioxide, ozone, and so forth. In another example, the air quality sensor 950 may comprise one or more elements to detect particulate matter in the air, such as a photoelectric detector, ionization chamber, and so forth. In another example, the air quality sensor 950 may include a hygrometer that provides information indicative of relative humidity.

An ambient light sensor 952 may comprise one or more photodetectors 942 or other light-sensitive elements that are used to determine one or more of the color, intensity, or duration of ambient lighting around the AMD 104.

An ambient temperature sensor 954 provides information indicative of the temperature of the ambient physical space 102 proximate to the AMD 104. In some implementations, an infrared temperature sensor may be utilized to determine the temperature of another object at a distance.

A floor analysis sensor 956 may include one or more components that are used to generate at least a portion of floor characterization data. In one implementation, the floor analysis sensor 956 may comprise circuitry that may be used to determine one or more of the electrical resistance, electrical inductance, or electrical capacitance of the floor 106. For example, two or more of the wheels in contact with the floor 106 may include an allegedly conductive pathway between the circuitry and the floor 106. By using two or more of these wheels, the circuitry may measure one or more of the electrical properties of the floor 106. Information obtained by the floor analysis sensor 956 may be used by one or more of the safety module 818, the autonomous navigation module 186, the task module 830, and so forth. For example, if the floor analysis sensor 956 determines that the floor 106 is wet, the safety module 818 may decrease the speed of the AMD 104 and generate a notification alerting the user 114.

The floor analysis sensor 956 may include other components as well. For example, a coefficient of friction sensor may comprise a probe that comes into contact with the surface and determines the coefficient of friction between the probe and the floor 106.

A caster rotation sensor 958 provides data indicative of one or more of a direction of orientation, angular velocity, linear speed of the caster, and so forth. For example, the caster rotation sensor 958 may comprise an optical encoder and corresponding target that is able to determine that the caster transitioned from an angle of 0° at a first time to 49° at a second time.

The sensors 134 may include a radar 960. The radar 960 may be used to provide information as to a distance, lateral position, and so forth, to an object.

The sensors 134 may include a passive infrared (PIR) sensor 962. The PIR sensor 962 may be used to detect the presence of users 114, pets, hotspots, and so forth. For example, the PIR sensor 962 may be configured to detect infrared radiation with wavelengths between 9 and 14 micrometers.

The AMD 104 may include other sensors 964 as well. For example, a capacitive proximity sensor may be used to provide proximity data to adjacent objects. Other sensors 964 may include radio frequency identification (RFID) readers, near field communication (NFC) systems, coded aperture cameras, and so forth. For example, NFC tags may be placed at various points within the physical space 102 to provide landmarks for the autonomous navigation module 186. One or more touch sensors may be utilized to determine contact with a user 114 or other objects.

The AMD 104 may include one or more output devices 812. A motor 132 may be used to provide linear or rotary motion. A light 982 may be used to emit photons. A speaker 984 may be used to emit sound. A display 986 may comprise one or more of a liquid crystal display, light emitting diode display, electrophoretic display, cholesteric liquid crystal display, interferometric display, and so forth. The display 986 may be used to present visible information such as graphics, pictures, text, and so forth. In some implementations, the display 986 may comprise a touchscreen that combines a touch sensor and a display 986.

In some implementations, the AMD 104 may be equipped with a projector 988. The projector 988 may be able to project an image on a surface, such as the floor 106, wall, ceiling, and so forth.

A scent dispenser 990 may be used to emit one or more smells. For example, the scent dispenser 990 may comprise a plurality of different scented liquids that may be evaporated or vaporized in a controlled fashion to release predetermined amounts of each.

One or more moveable component actuators 992 may comprise an electrically operated mechanism such as one or more of a motor 132, solenoid, piezoelectric material, electroactive polymer, shape-memory alloy, and so forth. An actuator controller may be used to provide a signal or other input that operates one or more of the moveable component actuators 992 to produce movement of the moveable component.

In other implementations, other 994 output devices may be utilized. For example, the AMD 104 may include a haptic output device that provides output that produces particular touch sensations to the user 114. Continuing the example, a motor 132 with an eccentric weight may be used to create a buzz or vibration to allow the AMD 104 to simulate the purr of a cat.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:

a depth image sensor;

one or more motors;

one or more processors; and one or more computer readable media storing processor executable instructions which, when executed using the one or more processors, cause the AMD to:

acquire depth image data of a physical space using the depth image sensor;

determine segmentation data based on the depth image data, wherein the segmentation data is indicative of, for at least a portion of pixels within the depth image data:

a first class indicative of a floor, or a second class indicative of a class other than the floor;

determine, based on the depth image data, point cloud data indicative of coordinates of a plurality of points with respect to the physical space;

determine, based on the point cloud data that is associated with the first class, floor plane data indicating an estimated floor plane that is indicative of a floor that the AMD is supported by;

determine a first cluster based on the segmentation data, wherein the first cluster comprises pixels associated with the second class;

determine, based on the first cluster, a first bounding box that encompasses the first cluster;

determine, for the first bounding box, a first metric based on the point cloud data and the estimated floor plane, wherein the first metric is determined by:

determining, based on the first bounding box and the point cloud data, a first set of the plurality of points that are associated with pixels within the first bounding box, determining, based on the point cloud data and the estimated floor plane, a first count of the points in the first set that are less than a first threshold height above the estimated floor plane, and determining, based on the point cloud data and the estimated floor plane, a second count of the points of the first set that are less than a second threshold height above the estimated floor plane, wherein the second threshold height is greater than the first threshold height, and wherein the first metric is determined based on the first count of the points and the second count of the points;

determine that the first metric is less than a first threshold;

determine obstacle data that indicates the first cluster is a low-height obstacle (LHO); and operate the one or more motors to move the AMD within the physical space, based at least in part on the obstacle data.

2. The AMD of claim 1, wherein the one or more computer readable media store processor executable instructions which, when executed using the one or more processors, cause the AMD to:

determine a specified region comprising pixels of the depth image data that are between a horizon boundary line that is associated with the physical space as presented in the depth image data and a lower boundary line that is below the horizon boundary line, with respect to local vertical; and wherein:

the point cloud data is determined based on the pixels within the specified region; and the first cluster is within the specified region.

3. The AMD of claim 1, wherein the one or more computer readable media store processor executable instructions which, when executed using the one or more processors, cause the AMD to:

determine a first set of pixels within the segmentation data that are:

associated with the second class, contiguous, and either bounded by an edge of the segmentation data or a pixel that is associated with the first class; and wherein the first cluster comprises the first set of pixels.

4. The AMD of claim 1, wherein the one or more computer readable media store processor executable instructions which, when executed using the one or more processors, cause the AMD to:

determine, based on the first cluster, a second bounding box that encompasses the first cluster;

determine a first area of the second bounding box;

determine that the first area is greater than a threshold area; and divide the second bounding box into the first bounding box and one or more additional bounding boxes.

5. The AMD of claim 1, wherein the first metric is determined by dividing the first count of the points by the second count of the points.

6. The AMD of claim 1, wherein the one or more computer readable media store processor executable instructions which, when executed using the one or more processors, cause the AMD to:

determine path plan data indicative of a path through the physical space that passes at least through a portion of the physical space that is associated with the LHO indicated by the obstacle data; and wherein the one or more motors are operated to move the AMD along the path and through the portion of the physical space that is associated with the LHO.

7. A computer-implemented method comprising:

acquiring distance data of a physical space;

determining segmentation data based on the distance data;

determining a first cluster based on the segmentation data, wherein the first cluster comprises pixels associated with a first class;

determining, based on the first cluster, a first bounding box that encompasses the first cluster;

determining, based on the distance data, a first set of height data indicative of a height above a floor plane of a plurality of points associated with the first bounding box;

determining, for the first bounding box, a first metric based on the first set of height data, wherein the determining the first metric comprises:

determining, based on the first bounding box and the first set of height data, a first set of heights that are associated with pixels within the first bounding box, determining, based on the first set of heights, a first count of the points that are less than a first threshold height, and determining, based on the first set of heights, a second count of the points that are less than a second threshold height, wherein the first metric is determined based on the first count of the points and the second count of the points;

determining, based on the first metric, obstacle data that indicates a portion of the physical space that is associated with an obstacle; and operating, based on the obstacle data, one or more motors to move an autonomous mobile device within the physical space.

8. The method of claim 7, further comprising:

determining a specified region comprising pixels of the distance data that are between:

a) a horizon boundary line that is associated with the physical space as presented in the distance data, and b) a lower boundary line that is below the horizon boundary line, with respect to local vertical; and wherein:

the first set of height data is determined based on the pixels within the specified region; and the first cluster is within the specified region.

9. The method of claim 7, further comprising:

determining, based on the first cluster, a second bounding box that encompasses the first cluster;

determining a first area of the second bounding box;

determining that the first area is greater than a threshold area; and dividing the second bounding box into the first bounding box and one or more additional bounding boxes.

10. The method of claim 7, wherein:

the first metric is determined by dividing the first count of the points by the second count of the points.

11. The method of claim 7, further comprising:

determining, based on the first set of height data, that the obstacle is a low-height obstacle;

determining path plan data indicative of a path through the physical space that passes through at least a portion of the physical space that is associated with the obstacle indicated by the obstacle data; and wherein the one or more motors are operated to move the autonomous mobile device along the path and through the portion of the physical space that is associated with the obstacle.

12. The method of claim 7, further comprising:

determining, based on the distance data, point cloud data indicative of coordinates of the plurality of points with respect to the physical space;

determining floor plane data, based on the point cloud data, that is indicative of an estimated floor plane the autonomous mobile device is supported by; and wherein the first set of height data is determined based on the coordinates of the plurality of points and the floor plane data.

13. A mobile robotic device comprising:

one or more sensors;

one or more motors;

one or more processors; and one or more computer readable media storing processor executable instructions which, when executed using the one or more processors, cause the mobile robotic device to:

determine, using the one or more sensors, first data comprising;

distance data indicating a set of distances for pixel locations for one or more frames, and image data indicating a set of pixel values for pixel locations for the one or more frames;

determine, based on the image data and using a machine learning model, a first set of one or more pixels associated with a potential detected obstacle;

determine, based on the first data, point cloud data;

determine, based on the point cloud data, height data indicative of a height above a floor plane of a plurality of points associated with the first set of one or more pixels;

determine, using the height data, a first number of points associated with the first set that have a height value below a first threshold, and a second number of points associated with the first set that have a height value below a second threshold;

determine, based on the first number of points and the second number of points, obstacle data that indicates a portion of a physical space that is associated with the first set is an obstacle; and operate, based on the obstacle data, the one or more motors to move the mobile robotic device within physical space.

14. The mobile robotic device of claim 13, wherein the obstacle data indicates that the portion of the physical space that is associated with the first set is a low-height obstacle.

15. The mobile robotic device of claim 13, wherein the obstacle data indicates that the portion of the physical space that is associated with the first set is an obstacle that is not a low-height obstacle.

16. The mobile robotic device of claim 13, wherein the image data comprises grayscale image data determined based on depth data.

17. The mobile robotic device of claim 13, wherein the one or more computer readable media store processor executable instructions which, when executed using the one or more processors, cause the mobile robotic device to:

determine, based on the image data and using the machine learning model, segmentation data indicating one or more segmentation regions, including a first segmentation region; and determine, based on the image data and using the machine learning model, a first class for the first segmentation region;

wherein the first set of pixels is determined based on the segmentation data.

18. The mobile robotic device of claim 13, wherein the one or more computer readable media store processor executable instructions which, when executed using the one or more processors, cause the mobile robotic device to:

determine, based on the image data, a first bounding box associated with the potential detected obstacle;

wherein the first set of pixels is determined based on the first bounding box.

19. The mobile robotic device of claim 13, wherein the one or more computer readable media store processor executable instructions which, when executed using the one or more processors, cause the mobile robotic device to:

determine, based on the image data and using the machine learning model, second data indicating a first detected object;

wherein the first set of pixels is determined based on the second data.

20. The mobile robotic device of claim 13, wherein, in determining the first number of points, points having a negative height value qualify as below the first threshold.

* * * * *